(12) United States Patent
Lin

(10) Patent No.: US 12,045,877 B2
(45) Date of Patent: Jul. 23, 2024

(54) METHOD OF VERIFYING REAL ESTATE TRANSACTION

(71) Applicant: Nankuei Lin, Taipei (TW)

(72) Inventor: Nankuei Lin, Taipei (TW)

( * ) Notice: Subject to any disclaimer, the term of this patent is extended or adjusted under 35 U.S.C. 154(b) by 197 days.

(21) Appl. No.: 17/809,012

(22) Filed: Jun. 27, 2022

(65) Prior Publication Data

US 2022/0327615 A1 Oct. 13, 2022

(30) Foreign Application Priority Data

Jan. 28, 2022 (TW) ................................. 111103971

(51) Int. Cl.
*G06Q 50/16* (2024.01)
*G06Q 40/03* (2023.01)

(52) U.S. Cl.
CPC ............ *G06Q 40/03* (2023.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 11,488,242 B1 * | 11/2022 | Csabi | ...................... | G06Q 40/06 |
| 11,520,836 B2 * | 12/2022 | Smith | ................... | G06Q 10/103 |
| 11,593,802 B1 * | 2/2023 | Hoecherl | ......... | G06Q 10/06311 |
| 2007/0050290 A1 * | 3/2007 | Heitner | .................. | G06Q 20/10 |
| | | | | 705/39 |
| 2010/0174658 A1 * | 7/2010 | Marlow | ................. | G06Q 30/00 |
| | | | | 705/38 |
| 2012/0254045 A1 * | 10/2012 | Orfano | ................... | G06Q 30/06 |
| | | | | 705/306 |
| 2018/0053269 A1 * | 2/2018 | Heatherly | .............. | G06Q 50/16 |
| 2018/0285991 A1 * | 10/2018 | Wickersham | ........ | G06Q 50/167 |
| 2019/0206002 A1 * | 7/2019 | Gupta | .................... | G06Q 50/16 |
| 2019/0304039 A1 * | 10/2019 | Wickersham | ........ | G06Q 50/163 |
| 2019/0311447 A1 * | 10/2019 | Strnad, II | .............. | G06Q 40/06 |
| 2020/0013126 A9 * | 1/2020 | Wickersham | ...... | G06Q 10/1095 |
| 2020/0134750 A1 * | 4/2020 | Wolf | ................... | G06F 3/04847 |
| 2020/0160360 A1 * | 5/2020 | Wickersham | ........ | G06Q 50/163 |
| 2020/0387544 A1 * | 12/2020 | Smith | ................... | G06Q 10/103 |
| 2020/0394714 A1 * | 12/2020 | Strnad, II | .............. | G06Q 40/03 |
| 2020/0402116 A1 * | 12/2020 | Avrahami | .......... | G06Q 30/0278 |
| 2020/0404054 A1 * | 12/2020 | Avrahami | ............. | H04L 65/611 |
| 2022/0138705 A1 * | 5/2022 | Wright | ................. | G06Q 20/065 |
| | | | | 705/39 |
| 2022/0327615 A1 * | 10/2022 | Lin | ........................ | G06Q 50/16 |
| 2022/0343423 A1 * | 10/2022 | Lin | ........................ | G06Q 40/03 |
| 2022/0374884 A1 * | 11/2022 | Wai | ....................... | G06Q 20/223 |
| 2022/0391864 A1 * | 12/2022 | Tan | ....................... | G06Q 20/065 |

FOREIGN PATENT DOCUMENTS

WO WO-2007028143 A2 * 3/2007 ............. G06Q 20/10

* cited by examiner

*Primary Examiner* — Luis A Brown

(57) ABSTRACT

A method of intelligently verifying real estate transaction procedure is implemented in a system of intelligently verifying real estate transaction procedure including an intelligent real estate transaction procedure platform system and an intelligent real estate transaction procedure management system. The intelligent real estate transaction procedure platform system enables a buyer to start a real estate transaction procedure and stores relevant real estate transaction documents and real estate transaction records in a proof system as proof.

1 Claim, 14 Drawing Sheets

| index code of verification record of real estate transcation record data |
|---|
| serial number of transaction procedure of transaction record data |
| serial number of verification information of transaction record verification information |
| sequence verification code of transaction record verification information |
| data code of record of transaction record data |

FIG.3A

| transaction record verification information table |
|---|
| transaction record verification information |
| transaction record verification information |
| . . |
| transaction record verification information |

FIG.3B

| transaction record verification information | |
|---|---|
| serial number of verification information of transaction record verification information | sequence verification code of verification information of transaction record verification information |
| | verification code of information of transaction record verification information |
| | data access code of verification information record of transaction record verification data |
| | ⋮ |
| | data access code of verification information record of transaction record verification data |

FIG.3C storage address table of verification information record data

| data access address of verification information record of transaction record data | data access address of verification information record of transaction record data | . . | data access address of verification information record of transaction record data |
|---|---|---|---|

FIG.4A

| data access address of verification information record of transaction record data |
|---|
| data access code of verification information record of transaction record data |
| data storage address of verification information record of transaction record data |

FIG.4B

| index code of verification record of real estate transcation file data |
|---|
| serial number of transaction procedure of transaction file data |
| serial number of verification information of transaction file verification information |
| sequence verification code of transaction file verification information |
| data code of file of transaction file data |

FIG.5A

| transaction file verification information table | | | |
|---|---|---|---|
| transaction file verification information | transaction file verification information | . . . | transaction file verification information |

FIG.5B

| serial number of verification information of transaction file verification information | transaction file verification information |
|---|---|
| | sequence verification code of verification information of transaction file verification information |
| | verification code of information of transaction file verification information |
| | data access code of verification information file of transaction file verification data |
| | . . |
| | data access code of verification information file of transaction file verification data |

FIG.5C

| data code of verification information file of transaction file verification data |
|---|
| data code of file of transaction file verification data | data access code of verification information file of transaction file verification data

FIG.5D

| storage address table of verification information file data | | | |
|---|---|---|---|
| data access address of verification information file of transaction file data | data access address of verification information file of transaction file data | . . . | data access address of verification information file of transaction filet data |

FIG.6A

| data access code of verification information file of transaction file data | data storage address of verification information file of transaction file data |
|---|---| data access address of verification information file of transaction file data

FIG.6B

METHOD OF VERIFYING REAL ESTATE TRANSACTION

FIELD OF THE INVENTION

The invention relates to real estate transactions and more particularly to a method of intelligently verifying real estate transaction procedure.

BACKGROUND OF THE INVENTION

A real estate transaction is the process that occurs when a seller offers their home for sale, and a buyer agrees to purchase that property. There are many steps involved in buying a house, and the steps vary depending on the type of transaction and state regulations. Before the closing can take place, and before the title of the property transfers to the buyer, a multitude of activities and tasks must be completed on time. The real estate agents involved are primarily responsible for these tasks, however, the buyer and seller must complete their tasks expeditiously.

Unfortunately, fraud may occur in the real estate transaction. Thus, it is desirable to provide a mechanism of verifying real estate transaction procedure. Specifically, it is desirable to provide a method of verifying document files and data records involved in a real estate transaction procedure so that interests of both the seller and the buyer can be protected.

SUMMARY OF THE INVENTION

It is therefore one object of the invention to provide a method of intelligently verifying real estate transaction procedure implemented in a system of intelligently verifying real estate transaction procedure including an intelligent real estate transaction procedure platform system and an intelligent real estate transaction procedure management system.

The above and other objects, features and advantages of the invention will become apparent from the following detailed description taken with the accompanying drawings

BRIEF DESCRIPTION OF THE DRAWINGS

FIGS. 3A, 3B, 3C AND 3D schematically depict a first portion of a method of the invention respectively;

FIGS. 4A and 4B schematically depict a second portion of a method of the invention respectively;

FIGS. 5A, 5B, 5C and 5D schematically depict a third portion of a method of the invention respectively; and FIGS. 6A and 6B schematically depict a fourth portion of a method of the invention respectively.

DETAILED DESCRIPTION OF THE INVENTION

Figure 1:
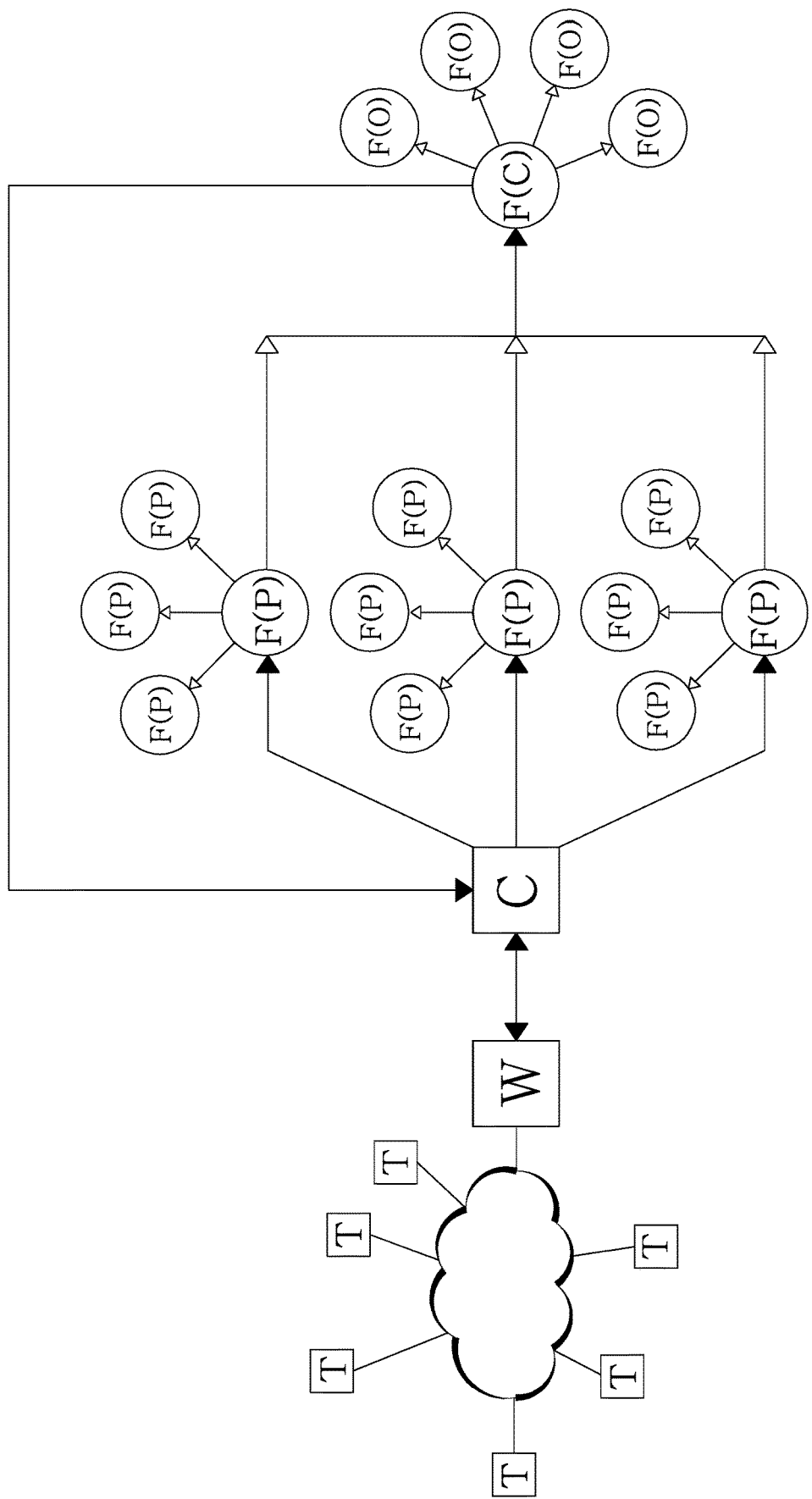
FIG. 1 schematically depicts a portion of a system for implementing a method of the invention.
Figure 2:
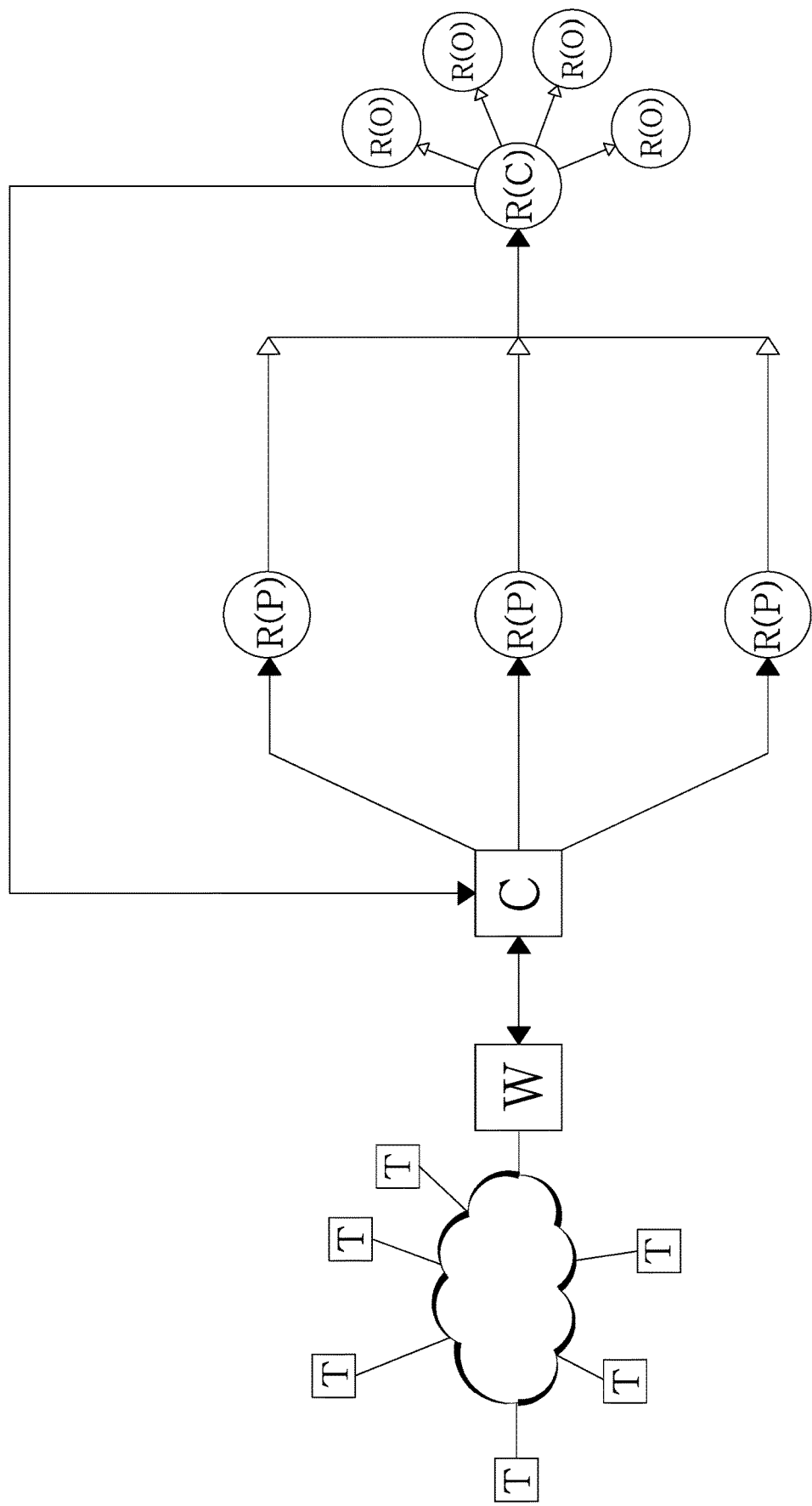
FIG. 2 schematically depicts the remaining portion of the system.
Figure 3D:
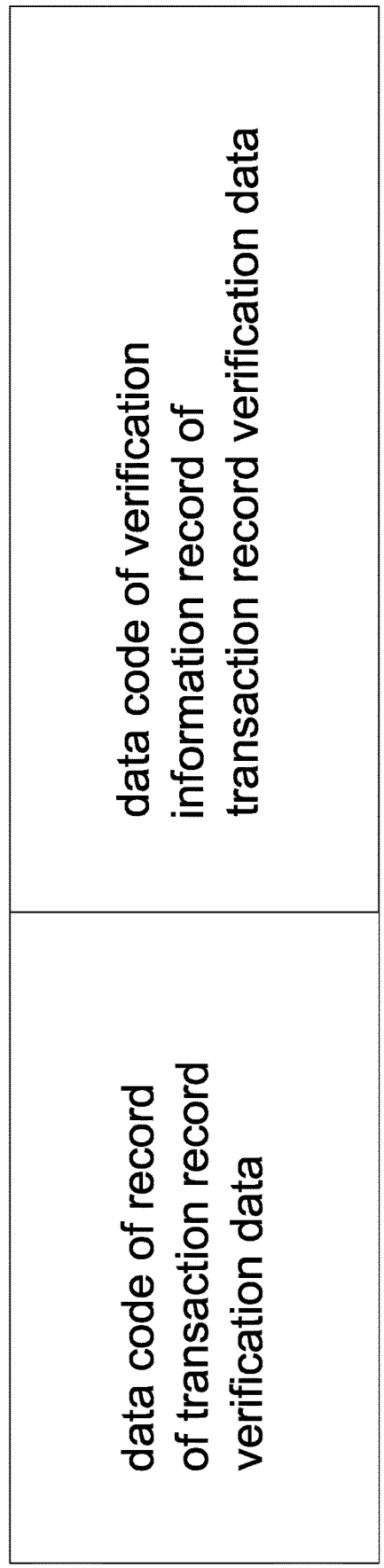

Referring to FIGS. 1 to 6B, a method of intelligently verifying real estate transaction procedure of the invention is implemented in a system of intelligently verifying real estate transaction procedure. The system of intelligently verifying real estate transaction procedure includes an intelligent real estate transaction procedure platform system and an intelligent real estate transaction procedure management system.

The intelligent real estate transaction procedure platform system includes an intelligent real estate transaction procedure platform server W and a plurality of remote terminals T. The intelligent real estate transaction procedure management system includes an intelligent real estate transaction procedure management server C, a plurality of real estate transaction data processing servers F(P), a real estate transaction data control server F(C), a plurality of real estate transaction data operation servers F(O), a plurality of real estate transaction procedure processing servers R(P), a real estate transaction procedure control server R(C) and a plurality of real estate transaction procedure operation servers R(O).

The intelligent real estate transaction procedure platform server W is connected to the internet and is connected to the intelligent real estate transaction procedure management server C via an intranet in which the remote terminals T configured to connected to the intelligent real estate transaction procedure platform server W via the internet. The intelligent real estate transaction procedure management server C, the real estate transaction data processing servers F(P), the real estate transaction data control server F(C), the real estate transaction data operation servers F(O), the real estate transaction procedure processing servers R(P), the real estate transaction procedure control servers R(C) and the real estate transaction procedure operation servers R(O) are interconnected via the intranet.

The intelligent real estate transaction procedure management server C includes a real estate transaction procedure proof information index table and a plurality of real estate transaction procedure data registers in which the real estate transaction procedure data registers include a plurality of real estate transaction application procedure data registers, a plurality of real estate transaction investigation procedure data registers, a plurality of real estate transaction appraisal procedure data registers, a plurality of real estate transaction agreement procedure data registers, a plurality of real estate transaction setting procedure data registers and a plurality of real estate transaction approval procedure data registers.

The real estate transaction data processing server F(P) includes a real estate transaction file register, a real estate transaction file division file register, a real estate transaction file division record register, a real estate transaction file proof information register to be updated, a proof information file storage data register, and a real estate transaction file proof information register in which the real estate transaction file proof information register includes a proof information file storage data storage address record table and a real estate transaction file proof information table. The real estate transaction file proof information table includes a plurality of real estate transaction file proof information.

The real estate transaction data control server F(C) includes a real estate transaction file storage data register, an operation verification data register, a proof information file storage data register, and a real estate transaction file proof information register in which the real estate transaction file proof information register includes a proof information file storage data storage address record table and a real estate transaction file proof information table. The real estate transaction file proof information table includes a plurality of real estate transaction file proof information.

The real estate transaction data operation server F(O) includes a real estate transaction file proof information register to be updated, a proof information file storage data register, and a real estate transaction file proof information register in which the real estate transaction file proof information register includes a proof information file storage data storage address record table and a real estate transaction file proof information table. The real estate transaction file proof information table includes real estate transaction file proof information.

The real estate transaction procedure processing server R(P) includes a real estate transaction record register, a real estate transaction record proof information register to be updated, a proof information record storage data register, and a real estate transaction record proof information register in which the real estate transaction record proof information register includes a proof information record storage data storage address record table and a real estate transaction record proof information table. The real estate transaction record proof information table includes real estate transaction record proof information.

The real estate transaction procedure control server R(C) includes a real estate transaction record storage data register, an operation verification data register, a proof information record storage data register, and a real estate transaction record proof information register in which the real estate transaction record proof information register includes a proof information record storage data storage address record table and a real estate transaction record proof information table. The real estate transaction record proof information table includes real estate transaction record proof information.

The real estate transaction procedure operation server R(O) includes a real estate transaction record proof information register to be updated, a proof information record storage data register, and a real estate transaction record proof information register in which the real estate transaction record proof information register includes a proof information record storage data storage address record table and a real estate transaction record proof information table. The real estate transaction record proof information table includes real estate transaction record proof information.

The method of intelligently verifying real estate transaction procedure comprises:
  enabling a user to connect to the intelligent real estate transaction procedure platform server W via the remote terminal and internet, log in the intelligent real estate transaction procedure platform server W to verify a user name and a password, and obtain platform system member rights to for data communications; enabling the user to enter a real estate transaction procedure via the intelligent real estate transaction procedure platform server W in which the intelligent real estate transaction procedure platform server provides a user privilege share encoding and decoding data sequence and a personal encoding and decoding data sequence based on a non-symmetrical encoding and decoding algorithm in which the user is a buyer, a relative of the buyer, a lawyer, a real estate broker, a secretary, an appraisal specialist, or a bank employee;
  enabling the user to set an intelligent real estate transaction procedure via the intelligent real estate transaction procedure platform server W so that the user becomes a real estate transaction procedure owner of an intelligent real estate transaction procedure in which the intelligent real estate transaction procedure includes a plurality of real estate transaction procedures including a real estate transaction application procedure, a real estate transaction investigation procedure, a real estate transaction appraisal procedure, a real estate transaction agreement procedure, a real estate transaction setting procedure, and a real estate transaction approval procedure; and in which the real estate transaction procedures of the intelligent real estate transaction procedure are performed sequentially;
  in which in performing one of the real estate transaction procedures of the intelligent real estate transaction procedure, the real estate transaction procedure owner sends a system confirmation notice of joining the real estate transaction procedure to another user via the intelligent real estate transaction procedure platform server W to invite another user to join the real estate transaction procedure, after another user's positive reply to the system confirmation notice of joining the real estate transaction procedure, another user becomes a real estate transaction procedure participant of the real estate transaction procedure in which the real estate transaction procedure participant is allowed to only participate the invited real estate transaction procedure not other uninvited real estate transaction procedures;
  in which in performing the real estate transaction procedure, the real estate transaction procedure owner or the real estate transaction procedure participant uses a non-symmetrical encoding and decoding algorithm to encode or decode data to ensure real estate transaction data access privilege and data safety so that the real estate transaction procedure owner or the real estate transaction procedure participant uses a shared encoded data sequence to encode data and uses a shared decoded data sequence to decode data or a personal encoded data sequence to encode data and uses a personal decoded data sequence to decode data;
  in which the real estate transaction application procedure of the intelligent real estate transaction procedure uses the intelligent real estate transaction procedure platform server W to preset a plurality of real estate transaction files to be uploaded and a plurality of real estate transaction records to be loaded in which the real estate transaction files to be uploaded include a real estate transaction application and a financial statement, the real estate transaction records to be uploaded include an application procedure text record and an application procedure real estate transaction information record;
  in which the real estate transaction investigation procedure uses the intelligent real estate transaction procedure platform server W to preset a plurality of real estate transaction files to be uploaded and a plurality of real estate transaction records to uploaded in which the real estate transaction files to be uploaded includes a personal credit report, the real estate transaction records to be uploaded include an investigation procedure text record and an investigation procedure real estate transaction information record;
  In which the real estate transaction appraisal procedure uses the intelligent real estate transaction procedure platform server W to preset a plurality of real estate transaction files to be uploaded and a plurality of real estate transaction records to be uploaded in which the real estate transaction files to be uploaded include a collateral appraisal report, the real estate transaction records to be uploaded include an appraisal procedure text record and an appraisal procedure real estate transaction information record;
  in which the real estate transaction agreement procedure uses the intelligent real estate transaction procedure platform server W to preset a plurality of real estate transaction files to be uploaded and a plurality of real estate transaction records to be uploaded in which the real estate transaction files to be uploaded include a real estate transaction agreement, an identification document, a driver license, a license application, and a house certificate, the real estate transaction records to be uploaded include an agreement procedure text record and an agreement procedure real estate transaction information record;

in which the real estate transaction setting procedure uses the intelligent real estate transaction procedure platform server W to preset a plurality of real estate transaction files to be uploaded and a plurality of real estate transaction records to be uploaded in which the real estate transaction files to be uploaded include an asset security setting application and a house certificate, the real estate transaction records to be uploaded include a setting procedure text record and a setting procedure real estate transaction information record;

in which the real estate transaction approval procedure uses the intelligent real estate transaction procedure platform server W to preset a plurality of real estate transaction files to be uploaded and a plurality of real estate transaction records to be uploaded in which the real estate transaction files to be uploaded include a real estate transaction item transfer slip, the real estate transaction records to be uploaded include an approval procedure text record and an approval procedure real estate transaction information record;

in which the real estate transaction procedure owner uses the intelligent real estate transaction procedure platform server W to add or delete the preset real estate transaction files to be uploaded in order to add or delete the real estate transaction file to be uploaded with respect to one of the real estate transaction procedures of the intelligent real estate transaction procedure, or add or delete the preset uploaded real estate transaction records to be uploaded in order to add or delete the real estate transaction records to be uploaded;

in which in a process the real estate transaction application procedure of the intelligent real estate transaction procedure uploads the real estate transaction files to be uploaded or the real estate transaction records to be uploaded to the intelligent real estate transaction procedure platform server W via the real estate transaction procedure owner or the real estate transaction procedure participant of the real estate transaction application procedure, the intelligent real estate transaction procedure platform server W sends same to the real estate transaction application procedure data register set by the intelligent real estate transaction procedure management server C via the intranet, and stores the real estate transaction files to be uploaded as real estate transaction proof files or store the real estate transaction records to be uploaded as real estate transaction proof records;

in which the real estate transaction application procedure uploads the real estate transaction files to be uploaded and the real estate transaction records to be uploaded to the real estate transaction application procedure data register of the intelligent real estate transaction procedure management server C and stores the corresponding real estate transaction proof files and the real estate transaction proof records, the real estate transaction procedure participant of the real estate transaction procedure owner or the real estate transaction application procedure checks the real estate transaction proof files and the real estate transaction proof records, and if it is correct the real estate transaction procedure participant of the real estate transaction procedure owner or the real estate transaction application procedure issues a confirmation notice of finishing the real estate transaction procedure;

in which after all of the real estate transaction procedure participants and the real estate transaction procedure owners of the real estate transaction application procedure have issued the confirmation notice of finishing the real estate transaction procedure, the real estate transaction application procedure is finished; the intelligent real estate transaction procedure management server C sets a corresponding real estate transaction procedure serial number of the real estate transaction application procedure data register and sends the real estate transaction procedure serial number to the intelligent real estate transaction procedure platform server W, the intelligent real estate transaction procedure platform server W sets the real estate transaction procedure serial number as a real estate transaction procedure serial number of the real estate transaction application procedure of the intelligent real estate transaction procedure; in which in a process the real estate transaction investigation procedure of the intelligent real estate transaction procedure, the real estate transaction files to be uploaded or the real estate transaction records to be uploaded of the real estate transaction investigation procedure are sent to the intelligent real estate transaction procedure platform server W via the real estate transaction procedure participant of the real estate transaction procedure owner or the real estate transaction investigation procedure, the intelligent real estate transaction procedure platform server W sends same to the real estate transaction investigation procedure data register of the intelligent real estate transaction procedure management server C via the intranet, stores the real estate transaction files to be uploaded as real estate transaction proof files or stores the real estate transaction records to be uploaded as real estate transaction proof records;

in which after the real estate transaction files to be uploaded and the real estate transaction records to be uploaded have been uploaded to the real estate transaction investigation procedure data register of the intelligent real estate transaction procedure management server C, the real estate transaction investigation procedure stores them as the real estate transaction proof files and the real estate transaction proof records, the real estate transaction procedure owner or the real estate transaction procedure participant of the real estate transaction investigation procedure checks the real estate transaction proof files and the real estate transaction proof records, and if it is correct, the real estate transaction procedure owner or the real estate transaction procedure participant of the real estate transaction investigation procedure sends a confirmation notice of finishing the real estate transaction procedure, after all of the real estate transaction procedure participants and the real estate transaction procedure owners of the real estate transaction investigation procedure have sent the confirmation notice of finishing the real estate transaction procedure, the real estate transaction investigation procedure is finished, the intelligent real estate transaction procedure management server C sets a corresponding real estate transaction procedure serial number with respect to the real estate transaction investigation procedure data register, sends the real estate transaction procedure serial number to the intelligent real estate transaction procedure platform server W, the intelligent real estate transaction procedure platform server W sends the real estate transaction procedure serial number as a real estate transaction procedure serial number of the real estate transaction investigation procedure of the intelligent real estate transaction procedure;

in which in a process the real estate transaction appraisal procedure of the intelligent real estate transaction procedure uploads the real estate transaction files to be uploaded and the real estate transaction records to be uploaded to the intelligent real estate transaction procedure platform server W via the real estate transaction procedure owner or the real estate transaction procedure participant the real estate transaction appraisal procedure, the intelligent real estate transaction procedure platform server W sends same to the corresponding real estate transaction appraisal procedure data register of the intelligent real estate transaction procedure management server C via the intranet, and stores the real estate transaction files to be uploaded as real estate transaction proof files or stores the real estate transaction records to be uploaded as real estate transaction proof records;

in which after the real estate transaction appraisal procedure has uploaded the real estate transaction files to be uploaded and the real estate transaction records to be uploaded to the real estate transaction appraisal procedure data register of the intelligent real estate transaction procedure management server C and has stored same as real estate transaction proof files and real estate transaction proof records, the real estate transaction procedure owner or the real estate transaction procedure participant of the real estate transaction appraisal procedure checks the real estate transaction proof files and the real estate transaction proof records, and if it is correct, the real estate transaction procedure owner or the real estate transaction procedure participant of the real estate transaction appraisal procedure issues a confirmation notice of finishing the real estate transaction procedure;

in which after all of the real estate transaction procedure participants and the real estate transaction procedure owners of the real estate transaction appraisal procedure have sent the confirmation notice of finishing the real estate transaction procedure, the real estate transaction appraisal procedure is finished, the intelligent real estate transaction procedure management server C sets a corresponding real estate transaction procedure serial number with respect to the real estate transaction appraisal procedure data register and sends the real estate transaction procedure serial number to the intelligent real estate transaction procedure platform server W, and the intelligent real estate transaction procedure platform server W sets the real estate transaction procedure serial number as a real estate transaction procedure serial number of the real estate transaction appraisal procedure of the intelligent real estate transaction procedure;

In which in a process the real estate transaction agreement procedure of the intelligent real estate transaction procedure uploads the real estate transaction files to be uploaded or the real estate transaction records to be uploaded to the intelligent real estate transaction procedure platform server W via the real estate transaction procedure owner or the real estate transaction procedure participant of the real estate transaction agreement procedure, the intelligent real estate transaction procedure platform server W sends same to a corresponding real estate transaction agreement procedure data register of the intelligent real estate transaction procedure management server C via the intranet, and stores the real estate transaction files to be uploaded as real estate transaction proof files or stores the real estate transaction records to be uploaded as real estate transaction proof records;

In which after the real estate transaction agreement procedure has uploaded the real estate transaction files to be uploaded and the real estate transaction records to be uploaded to the real estate transaction agreement procedure data register of the intelligent real estate transaction procedure management server C and has stored same as real estate transaction proof files and real estate transaction proof records, the real estate transaction procedure owner or the real estate transaction procedure participant of the real estate transaction agreement procedure checks the real estate transaction proof files and the real estate transaction proof records, and if it is correct, the real estate transaction procedure owner or the real estate transaction procedure participant of the real estate transaction agreement procedure issues a confirmation notice of finishing the real estate transaction procedure;

in which after all of the real estate transaction procedure participants and the real estate transaction procedure owners of the real estate transaction agreement procedure have sent the confirmation notice of finishing the real estate transaction procedure, the real estate transaction agreement procedure is finished, the intelligent real estate transaction procedure management server C sets a corresponding real estate transaction procedure serial number with respect to the real estate transaction agreement procedure data register and sends the real estate transaction procedure serial number to the intelligent real estate transaction procedure platform server W, and the intelligent real estate transaction procedure platform server W sets the real estate transaction procedure serial number as a real estate transaction procedure serial number of the real estate transaction agreement procedure of the intelligent real estate transaction procedure;

in which in a process the real estate transaction setting procedure of the intelligent real estate transaction procedure uploads the real estate transaction files to be uploaded or the real estate transaction records to be uploaded to the intelligent real estate transaction procedure platform server W via the real estate transaction procedure owner or the real estate transaction procedure participant of the real estate transaction setting procedure, the intelligent real estate transaction procedure platform server W sends same to the corresponding real estate transaction setting procedure data register of the intelligent real estate transaction procedure management server C via the intranet, and stores the real estate transaction files to be uploaded as real estate transaction proof files or stores the real estate transaction records to be uploaded as real estate transaction proof records;

in which after the real estate transaction setting procedure has uploaded the real estate transaction files to be uploaded and the real estate transaction records to be uploaded to the real estate transaction setting procedure data register of the intelligent real estate transaction procedure management server C and has stored same as real estate transaction proof files and real estate transaction proof records, the real estate transaction procedure owner or the real estate transaction procedure participant of the real estate transaction setting procedure checks the real estate transaction proof files and the real estate transaction proof records, and if it is correct, the real estate transaction procedure owner or the real estate transaction procedure participant of the real estate transaction setting procedure issues a confirmation notice of finishing the real estate transaction procedure;

in which after all of the real estate transaction procedure participants and the real estate transaction procedure owners of the real estate transaction setting procedure have sent the confirmation notice of finishing the real estate transaction procedure, the real estate transaction setting procedure is finished, the intelligent real estate transaction procedure management server C sets a corresponding real estate transaction procedure serial number with respect to the real estate transaction setting procedure data register and sends the real estate transaction procedure serial number to the intelligent real estate transaction procedure platform server W, and the intelligent real estate transaction procedure platform server W sets the real estate transaction procedure serial number as a real estate transaction procedure serial number of the real estate transaction setting procedure of the intelligent real estate transaction procedure;

in which in a process the real estate transaction approval procedure of the intelligent real estate transaction procedure uploads the real estate transaction files to be uploaded or the real estate transaction records to be uploaded to the intelligent real estate transaction procedure platform server W via the real estate transaction procedure owner or the real estate transaction procedure participant of the real estate transaction approval procedure, the intelligent real estate transaction procedure platform server W sends same to the corresponding real estate transaction approval procedure data register of the intelligent real estate transaction procedure management server C via the intranet, and stores the real estate transaction files to be uploaded as real estate transaction proof files or stores the real estate transaction records to be uploaded as real estate transaction proof records;

in which after the real estate transaction approval procedure has uploaded the real estate transaction files to be uploaded and the real estate transaction records to be uploaded to the real estate transaction approval procedure data register of the intelligent real estate transaction procedure management server C and has stored same as real estate transaction proof files and real estate transaction proof records, the real estate transaction procedure owner or the real estate transaction procedure participant of the real estate transaction approval procedure checks the real estate transaction proof files and the real estate transaction proof records, and if it is correct, the real estate transaction procedure owner or the real estate transaction procedure participant of the real estate transaction approval procedure issues a confirmation notice of finishing the real estate transaction procedure;

in which after all of the real estate transaction procedure participants and the real estate transaction procedure owners of the real estate transaction approval procedure have sent the confirmation notice of finishing the real estate transaction procedure, the real estate transaction approval procedure is finished, the intelligent real estate transaction procedure management server C sets a corresponding real estate transaction procedure serial number with respect to the real estate transaction approval procedure data register and sends the real estate transaction procedure serial number to the intelligent real estate transaction procedure platform server W, and the intelligent real estate transaction procedure platform server W sets the real estate transaction procedure serial number as a real estate transaction procedure serial number of the real estate transaction approval procedure of the intelligent real estate transaction procedure;

in which the intelligent real estate transaction procedure management server C sends the real estate transaction procedure serial number of the real estate transaction application procedure data register and the real estate transaction proof files to any of the real estate transaction data processing servers F(P) in a low operation storage work load via the intranet and stores same in the real estate transaction file register;

in which the real estate transaction data processing server F(P) performs a file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs a file encryption storage procedure on the real estate transaction file division record table so that a shared encryption and decryption data sequence of the real estate transaction procedure owner and each real estate transaction procedure participant of the real estate transaction application procedure are used to perform a data encryption storage of the real estate transaction file division record table and create a corresponding real estate transaction application procedure file storage data, further sends same from the real estate transaction application procedure file storage data to the real estate transaction data control server F(C) via the intranet and stores same in the real estate transaction file storage data register in which the real estate transaction data processing server F(P) sets a corresponding real estate transaction procedure serial number of the real estate transaction application procedure file storage data based on the real estate transaction procedure serial number of the real estate transaction application procedure data register, and the real estate transaction data processing server F(P) deletes data stored in both the real estate transaction file register and the real estate transaction file division record register;

in which the intelligent real estate transaction procedure management server C sends the real estate transaction procedure serial number and the real estate transaction proof files of the real estate transaction investigation procedure data register to any of the real estate transaction data processing servers F(P) in a low operation storage work load via the intranet and stores same in the real estate transaction file register;

in which the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction investigation procedure are used to perform a data encryption storage of the real estate transaction file division record table, create a corresponding real estate transaction investigation procedure file storage data, send the real estate transaction investigation procedure file storage data to the real estate transaction data control server F(C) via the intranet, and store same in the real estate transaction file storage data register in which the real estate transaction data processing server F(P) sets a corresponding real estate transaction procedure serial number of the real estate transaction investigation procedure file storage data based on the real estate transaction procedure serial number of the real estate transaction investigation procedure data register, and the real estate transaction data processing server F(P) deletes data stored in both the real estate transaction file register and the real estate transaction file division record register;

in which the intelligent real estate transaction procedure management server C sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

in which the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs a file encryption storage procedure on the real estate transaction file division record table so that a shared encryption and decryption data sequence of the real estate transaction procedure owner and each real estate transaction procedure participant of the real estate transaction application procedure are used to perform a data encryption storage of the real estate transaction file division record table and create a corresponding real estate transaction application procedure file storage data, further sends same from the real estate transaction application procedure file storage data to the real estate transaction data control server F(C) via the intranet and stores same in the real estate transaction file storage data register in which the real estate transaction data processing server F(P) sets a corresponding real estate transaction procedure serial number of the real estate transaction application procedure file storage data based on the real estate transaction procedure serial number of the real estate transaction application procedure data register, and the real estate transaction data processing server F(P) deletes data stored in both the real estate transaction file register and the real estate transaction file division record register;

in which the intelligent real estate transaction procedure management server C sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

in which the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction investigation procedure are used to perform a data encryption storage of the real estate transaction file division record table, create a corresponding real estate transaction investigation procedure file storage data, send the real estate transaction investigation procedure file storage data to the real estate transaction data control server F(C) via the intranet, and store same in the real estate transaction file storage data register in which the real estate transaction data processing server F(P) sets a corresponding real estate transaction procedure serial number of the real estate transaction investigation procedure file storage data based on the real estate transaction procedure serial number of the real estate transaction investigation procedure data register, and the real estate transaction data processing server F(P) deletes data stored in both the real estate transaction file register and the real estate transaction file division record register;

in which the intelligent real estate transaction procedure management server C sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

in which the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction setting procedure are used to perform a data encryption storage of the real estate transaction file division record table, create a corresponding real estate transaction setting procedure file storage data, send the real estate transaction setting procedure file storage data to the real estate transaction data control server F(C) via the intranet, and store same in the real estate transaction file storage data register in which the real estate transaction data processing server F(P) sets a corresponding real estate transaction procedure serial number of the real estate transaction setting procedure file storage data based on the real estate transaction procedure serial number of the real estate transaction setting procedure data register, and the real estate transaction data processing server F(P) deletes data stored in both the real estate transaction file register and the real estate transaction file division record register;

in which the intelligent real estate transaction procedure management server C sends the real estate transaction procedure serial number of the real estate transaction approval procedure data register and the real estate transaction proof files to any of the real estate transaction data processing servers F(P) in a low operation storage work load via the intranet and stores same in the real estate transaction file register;

in which the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

in which after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction approval procedure are used to perform a data encryption storage of the real estate transaction file division record table, create a corresponding real estate transaction approval procedure file storage data, send the real estate transaction approval procedure file storage data to the real estate transaction data control server F(C) via the intranet, and store same in the real estate transaction file storage data register in which the real estate transaction data processing server F(P) sets a corresponding real estate transaction procedure serial number of the real estate transaction approval procedure file storage data based on the real estate transaction procedure serial number of the real estate transaction approval procedure data register, and the real estate transaction data processing server F(P) deletes data stored in both the real estate transaction file register and the real estate transaction file division record register;

in which the real estate transaction file storage data register of the real estate transaction data control server F(C) stores real estate transaction file storage data in which the real estate transaction file storage data is the real estate transaction application procedure file storage data, the real estate transaction investigation procedure file storage data, the real estate transaction appraisal procedure file storage data, the real estate transaction agreement procedure file storage data, the real estate transaction setting procedure file storage data or the real estate transaction approval procedure file storage data;

in which the real estate transaction data control server F(C) sequentially accesses the real estate transaction file storage data stored in the real estate transaction file storage data register based on operation execution sequence of data operation verification period operation of the system and operation data and stores same in the operation verification data register, and in the data operation verification period, the real estate transaction data control server F(C) sequentially performs a storage data operation verification procedure, an added proof information procedure, and an updated proof information procedure on the real estate transaction file storage data stored in the operation verification data register;

in which the storage data operation verification procedure includes a first storage data operation verification procedure, a second storage data operation verification procedure, and a third storage data operation verification procedure;

in which the first storage data operation verification procedure including the real estate transaction data control server F(C) sends the real estate transaction file storage data of the operation verification data register to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

in which the real estate transaction data control server F(C) analyzes same and verifies that at least 50% of the value of the encryption operation is the same, the real estate transaction data control server F(C) correspondingly sets the value of the encryption operation as a file storage data operation code of the real estate transaction file storage data so as to finish an encoding procedure of the storage data of the real estate transaction file storage data;

in which the real estate transaction data control server F(C) activates the real estate transaction data operation server F(O) to finish the storage data encoding procedure of the real estate transaction file storage data of the operation verification data register so as to set a corresponding file storage data operation code of the real estate transaction file storage data;

in which the second storage data operation verification procedure including the real estate transaction data control server F(C) sends the file storage data operation code of the real estate transaction file storage data to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

in which the real estate transaction data control server F(C) analyzes same and verifies that at least 50% of the value of the encryption operation is the same, the real estate transaction data control server F(C) correspondingly sets the value of the encryption operation as a file storage data code of the real estate transaction file storage data so as to finish an encoding procedure of the storage data of the real estate transaction file storage data;

in which the third storage data operation verification procedure including the real estate transaction data control server F(C) sends the file storage data code and the file storage data operation code of the real estate transaction file storage data to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

in which the real estate transaction data control server F(C) analyzes same and verifies that at least 50% of the value of the encryption operation is the same, the real estate transaction data control server F(C) correspondingly sets the value of the encryption operation as a proof information file storage data access code of the real estate transaction file storage data so as to finish a proof information encoding procedure of the real estate transaction file storage data;

in which the real estate transaction data control server F(C) activates the real estate transaction data operation server F(O) to finish the proof information encoding procedure of the real estate transaction file storage data of the operation verification data register so as to set a corresponding proof information file storage data access code of the real estate transaction file storage data;

in which the added proof information procedure includes a first added proof information procedure, a second added proof information procedure, a third added proof information procedure, a fourth added proof information procedure, and a fifth added proof information procedure;

in which the first added proof information procedure including the real estate transaction data control server F(C) stores the real estate transaction file storage data of the operation verification data register in the proof information file storage data register, sets a corresponding storage address as a proof information file storage data storage address of the real estate transaction file storage data, uses the proof information file storage data access code of the real estate transaction file storage data and the proof information file storage data storage address to set a proof information file storage data access address of the real estate transaction file storage data so as to finish the proof information storage record procedure of the real estate transaction file storage data;

in which after the real estate transaction data control server F(C) has finished the proof information storage record procedure of the real estate transaction file storage data of the operation verification data register, the real estate transaction data control server F(C) sets a corresponding proof information file storage data access address of the real estate transaction file storage data, and uses the proof information file storage data access address of the real estate transaction file storage data to create a storage record in the proof information file storage data storage address record table of the real estate transaction file proof information register;

in which the second added proof information procedure including the real estate transaction data control server F(C) sets the file storage data operation code of the real estate transaction file storage data and the proof information file storage data access code as a proof information file storage data access code of the real estate transaction file storage data to finish the proof information access code encoding procedure of the real estate transaction file storage data;

in which after the real estate transaction data control server F(C) has finished the proof information access code encoding procedure of the real estate transaction file storage data of the operation verification data register, the real estate transaction data control server F(C) sets a corresponding proof information file storage data access code of the real estate transaction file storage data;

in which the third added proof information procedure including the real estate transaction data control server F(C) sequentially sets a proof information serial number of the real estate transaction file proof information based on a serial number of a storage record in the real estate transaction file proof information of the real estate transaction file proof information table of the real estate transaction file proof information register, and sets an information verification code of the last real estate transaction file proof information of the real estate transaction file proof information table as a proof information sequence verification code of the real estate transaction file proof information, and sets the file storage data code as an information verification code of the real estate transaction file proof information;

in which the fourth added proof information procedure including the real estate transaction data control server F(C) sets the proof information serial number of the real estate transaction file proof information, the proof information sequence verification code, the information verification code, and the proof information file storage data access code of the real estate transaction file storage data as contents of the real estate transaction file proof information, and stores same in the real estate transaction file proof information table, and the real estate transaction file proof information is the last real estate transaction file proof information of the real estate transaction file proof information table;

in which the real estate transaction file proof information of the real estate transaction file proof information table sequentially stores a record in the real estate transaction file proof information table based on the set sequence of the real estate transaction file proof information, and creates a real estate transaction file proof information sequence;

in which the fifth added proof information procedure including the real estate transaction data control server F(C) sets the real estate transaction procedure serial number of the real estate transaction file storage data, the proof information serial number of the real estate transaction file proof information, the proof information sequence verification code, and the file storage data operation code of the real estate transaction file storage data as a proof information file storage data index code of the real estate transaction file storage data to finish proof information index encoding procedure of the real estate transaction file storage data;

in which after the real estate transaction data control server F(C) has finished the real estate transaction file storage data of the proof information index encoding procedure of the operation verification data register, the real estate transaction data control server F(C) sets a corresponding proof information file storage data index code of the real estate transaction file storage data, and sends the proof information file storage data index code of the real estate transaction file storage data to the intelligent real estate transaction procedure management server C via the intranet;

in which the intelligent real estate transaction procedure management server C analyzes the real estate transaction procedure serial number of the real estate transaction file storage data of the proof information file storage data index code based on the real estate transaction file storage data to verify that the real estate transaction procedure data register has same real estate transaction procedure serial number, stores the proof information file storage data index code of the real estate transaction file storage data in the real estate transaction procedure data register, and stores the proof information file storage data index code of the real estate transaction file storage data in the corresponding real estate transaction procedure data register;

in which the real estate transaction procedure data register is the real estate transaction application procedure data register, the real estate transaction investigation procedure data register, the real estate transaction appraisal procedure data register, the real estate transaction agreement procedure data register, the real estate transaction setting procedure data register, or the real estate transaction approval procedure data register;

in which the updated proof information procedure includes a first updated proof information procedure and a second updated proof information procedure;

in which the first updated proof information procedure including the real estate transaction data control server F(C) sends the real estate transaction file storage data of the operation verification data register, the proof information file storage data access code of the real estate transaction file storage data, and the real estate transaction file proof information to the real estate transaction data processing server F(P) via the intranet, and stores same in both the updated real estate transaction file proof information register of the real estate transaction data processing server F(P) and the updated real estate transaction file proof information register of the real estate transaction data operation server F(O); and the real estate transaction data control server F(C) deletes data stored in the operation verification data register;

in which the second updated proof information procedure including the real estate transaction data processing server F(P) stores the real estate transaction file storage data of the updated real estate transaction file proof information register in the proof information file storage data register, sets a corresponding storage address as a proof information file storage data storage address of the real estate transaction file storage data, sets the proof information file storage data access code of the real estate transaction file storage data and the proof information file storage data storage address as a proof information file storage data access address of the real estate transaction file storage data, and finishes proof information storage record procedure of the real estate transaction file storage data;

in which after the real estate transaction data processing server F(P) has finished the proof information storage record procedure of the real estate transaction file storage data of the updated real estate transaction file proof information register, the real estate transaction data processing server F(P) sets a corresponding proof information file storage data access address of the real estate transaction file storage data;

in which the real estate transaction data processing server F(P) stores the proof information file storage data access address of the real estate transaction file storage data in the proof information file storage data storage address record table of the real estate transaction file proof information register;

in which the real estate transaction data processing server F(P) sets the real estate transaction file proof information of the updated real estate transaction file proof information register in the real estate transaction file proof information table of the real estate transaction file proof information register, the real estate transaction file proof information is the last real estate transaction file proof information of the real estate transaction file proof information table, and finishes the real estate transaction file proof information updating procedure;

in which the real estate transaction file proof information of the real estate transaction file proof information table is sequentially stored in the real estate transaction file proof information table based on the set sequence of the real estate transaction file proof information, creates a real estate transaction file proof information sequence, and the real estate transaction data processing server F(P) deletes data stored in the updated real estate transaction file proof information register;

in which the real estate transaction data operation server F(O) stores the real estate transaction file storage data of the updated real estate transaction file proof information register in the proof information file storage data register, sets a corresponding storage address as a proof information file storage data storage address of the real estate transaction file storage data, sets the proof information file storage data access code of the real estate transaction file storage data and the proof information file storage data storage address as a proof information file storage data access address of the real estate transaction file storage data, and finishes the proof information storage record procedure of the real estate transaction file storage data;

in which after the real estate transaction data operation server F(O) has finished the real estate transaction file storage data of the proof information storage record procedure of the updated real estate transaction file proof information register, the real estate transaction data operation server F(O) sets a corresponding proof information file storage data access address of the real estate transaction file storage data, and stores the proof information file storage data access address of the real estate transaction file storage data in the proof information file storage data storage address record table of the real estate transaction file proof information register;

in which the real estate transaction data operation server F(O) sets the real estate transaction file proof information of the updated real estate transaction file proof information register in the real estate transaction file proof information table of the real estate transaction file proof information register, the real estate transaction file proof information is the last real estate transaction file proof information of the real estate transaction file proof information table, and finishes the real estate transaction file proof information updating procedure;

in which the real estate transaction file proof information of the real estate transaction file proof information table is sequentially stored in the real estate transaction file proof information table based on the set sequence of the real estate transaction file proof information, creates a real estate transaction file proof information sequence, and the real estate transaction data processing server F(P) deletes data stored in the updated real estate transaction file proof information register;

in which after the real estate transaction data processing server F(P) and the real estate transaction data operation server F(O) has finished the real estate transaction file proof information updating procedure respectively, the proof information procedure is updated;

in which contents of the real estate transaction file proof information table of the real estate transaction file proof information register of the real estate transaction data processing server F(P) and contents of the real estate transaction file proof information table of the real estate transaction file proof information register of the real estate transaction data operation server F(O) are the same as that of the real estate transaction file proof information table of the real estate transaction file proof information register of the real estate transaction data control server F(C) so as to simultaneously and synchronously update the real estate transaction file proof information table;

in which the intelligent real estate transaction procedure management server C sends the real estate transaction procedure serial number of the real estate transaction application procedure data register, the real estate transaction proof records and the proof information file storage data index code of the real estate transaction application procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction application procedure file storage data so that a shared encryption and decryption data sequence of the real estate transaction procedure owner and each real estate transaction procedure participant of the real estate transaction application procedure are used to perform a data encryption storage of the real estate transaction proof records and the proof information file storage data index code of the real estate transaction application procedure file storage data and create a corresponding real estate transaction application procedure record storage data; and further sends same from the real estate transaction application procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction application procedure record storage data based on the real estate transaction procedure serial number of the real estate transaction application procedure data register, and the real estate transaction procedure processing server R(P) deletes data stored in the real estate transaction record register;

in which the intelligent real estate transaction procedure management server C sends the real estate transaction procedure serial number of the real estate transaction investigation procedure data register, the real estate transaction proof records and the proof information file storage data index code of the real estate transaction investigation procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction investigation procedure file storage data so that a shared encryption and decryption data sequence of the real estate transaction procedure owner and each real estate transaction procedure participant of the real estate transaction application procedure are used to perform a data encryption storage of the real estate transaction proof records and the proof information file storage data index code of the real estate transaction investigation procedure file storage data and create a corresponding real estate transaction investigation procedure record storage data; and further sends same from the real estate transaction investigation procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction investigation procedure record storage data based on the real estate transaction procedure serial number of the real estate transaction investigation procedure data register, and the real estate transaction procedure processing server R(P) deletes data stored in the real estate transaction record register;

in which the intelligent real estate transaction procedure management server C sends the real estate transaction procedure serial number of the real estate transaction appraisal procedure data register, the real estate transaction proof records and the proof information file storage data index code of the real estate transaction appraisal procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction appraisal procedure file storage data so that a shared encryption and decryption data sequence of the real estate transaction procedure owner and each real estate transaction procedure participant of the real estate transaction appraisal procedure are used to perform a data encryption storage of the real estate transaction proof records and the proof information file storage data index code of the real estate transaction appraisal procedure file storage data and create a corresponding real estate transaction appraisal procedure record storage data; and further sends same from the real estate transaction appraisal procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction appraisal procedure record storage data based on the real estate transaction procedure serial number of the real estate transaction appraisal procedure data register, and the real estate transaction procedure processing server R(P) deletes data stored in the real estate transaction record register;

in which the intelligent real estate transaction procedure management server C sends the real estate transaction procedure serial number of the real estate transaction agreement procedure data register, the real estate transaction proof records and the proof information file storage data index code of the real estate transaction agreement procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction agreement procedure file storage data so that a shared encryption and decryption data sequence of the real estate transaction procedure owner and each real estate transaction procedure participant of the real estate transaction agreement procedure are used to perform a data encryption storage of the real estate transaction proof records and the proof information file storage data index code of the real estate transaction agreement procedure file storage data and create a corresponding real estate transaction agreement procedure record storage data; and further sends same from the real estate transaction agreement procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction agreement procedure record storage data based on the real estate transaction procedure serial number of the real estate transaction agreement procedure data register, and the real estate transaction procedure processing server R(P) deletes data stored in the real estate transaction record register;

in which the intelligent real estate transaction procedure management server C sends the real estate transaction procedure serial number of the real estate transaction setting procedure data register, the real estate transaction proof records and the proof information file storage data index code of the real estate transaction setting procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction setting procedure file storage data so that a shared encryption and decryption data sequence of the real estate transaction procedure owner and each real estate transaction procedure participant of the real estate transaction setting procedure are used to perform a data encryption storage of the real estate transaction proof records and the proof information file storage data index code of the real estate transaction setting procedure file storage data and create a corresponding real estate transaction setting procedure record storage data; and further sends same from the real estate transaction setting procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction setting procedure record storage data based on the real estate transaction procedure serial number of the real estate transaction setting procedure data register, and the real estate transaction procedure processing server R(P) deletes data stored in the real estate transaction record register;

in which the intelligent real estate transaction procedure management server C sends the real estate transaction procedure serial number of the real estate transaction approval procedure data register, the real estate transaction proof records and the proof information file storage data index code of the real estate transaction approval procedure file storage data to any of the real estate transaction procedure data processing servers R(P) in a low operation storage work load via the intranet and stores same in the real estate transaction record register;

in which the real estate transaction procedure processing server R(P) performs a record encryption storage procedure on the real estate transaction proof records of the real estate transaction record register and the proof information file storage data index code of the real estate transaction approval procedure file storage data so that a shared encryption and decryption data sequence of the real estate transaction procedure owner and each real estate transaction procedure participant of the real estate transaction approval procedure are used to perform a data encryption storage of the real estate transaction proof records and the proof information file storage data index code of the real estate transaction approval procedure file storage data and create a corresponding real estate transaction approval procedure record storage data; and further sends same from the real estate transaction approval procedure record storage data to the real estate transaction data control server R(C) via the intranet and stores same in the real estate transaction record storage data register;

in which the real estate transaction procedure processing server R(P) sets a corresponding real estate transaction procedure serial number of the real estate transaction approval procedure record storage data based on the real estate transaction procedure serial number of the real estate transaction approval procedure data register, and the real estate transaction procedure processing server R(P) deletes data stored in the real estate transaction record register;

in which the real estate transaction record storage data register of the real estate transaction procedure control server R(C) stores a plurality of real estate transaction record storage data in which the real estate transaction record storage data is the real estate transaction application procedure record storage data, the real estate transaction investigation procedure record storage data, the real estate transaction appraisal procedure record storage data, the real estate transaction agreement procedure record storage data, the real estate transaction setting procedure record storage data, or the real estate transaction approval procedure record storage data;

in which the real estate transaction procedure control server R(C) sequentially accesses the real estate transaction file storage data stored in the real estate transaction record storage data register based on operation execution sequence of data operation verification period operation of the system and operation data and stores same in the operation verification data register, and in the data operation verification period, the real estate transaction procedure control server R(C) sequentially performs a storage data operation verification procedure, an added proof information procedure, and an updated proof information procedure on the real estate transaction record storage data stored in the operation verification data register;

in which the storage data operation verification procedure includes a first storage data operation verification procedure, a second storage data operation verification procedure, and a third storage data operation verification procedure;

in which the first storage data operation verification procedure including the real estate transaction procedure control server R(C) sends the real estate transaction record storage data of the operation verification data register to the real estate transaction data operation server R(O), the real estate transaction data operation server R(O) performs a data encryption operation on the real estate transaction record storage data based on a system setting data encryption algorithm, and sends a value of the completed encryption operation to the real estate transaction data control server R(C);

in which the real estate transaction data control server R(C) analyzes same and verifies that at least 50% of the value of the encryption operation is the same, the real estate transaction data control server R(C) correspondingly sets the value of the encryption operation as a record storage data operation code of the real estate transaction record storage data so as to finish an encoding procedure of the storage data of the real estate transaction record storage data;

in which the real estate transaction data control server R(C) activates the real estate transaction data operation server R(O) to finish the proof information encoding procedure of the real estate transaction record storage data of the operation verification data register so as to set a corresponding proof information record storage data access code of the real estate transaction record storage data;

in which the second storage data operation verification procedure including the real estate transaction procedure control server R(C) sends the record storage data operation code of the real estate transaction record storage data to the real estate transaction data operation server R(O), the real estate transaction data operation server R(O) performs a data encryption operation on the real estate transaction record storage data based on a system setting data encryption algorithm, and sends a value of the completed encryption operation to the real estate transaction data control server R(C);

in which the real estate transaction data control server R(C) analyzes same and verifies that at least 50% of the value of the encryption operation is the same, the real estate transaction data control server R(C) correspondingly sets the value of the encryption operation as a record storage data operation code of the real estate transaction record storage data;

in which the third storage data operation verification procedure including the real estate transaction procedure control server R(C) sends the file storage data code and the file storage data operation code of the real estate transaction file storage data to the real estate transaction data operation server R(O), the real estate transaction data operation server R(O) performs a data encryption operation on the real estate transaction file storage data based on a system setting data encryption algorithm, and sends a value of the completed encryption operation to the real estate transaction data control server R(C);

in which the real estate transaction data control server R(C) analyzes same and verifies that at least 50% of the value of the encryption operation is the same, the real estate transaction data control server R(C) correspondingly sets the value of the encryption operation as a proof information file storage data access code of the real estate transaction file storage data so as to finish a proof information encoding procedure of the real estate transaction file storage data;

in which the real estate transaction data control server R(C) activates the real estate transaction data operation server R(O) to finish the proof information encoding procedure of the real estate transaction file storage data of the operation verification data register so as to set a corresponding proof information file storage data access code of the real estate transaction file storage data;

in which the real estate transaction procedure control server R(C) analyzes same and verifies that at least 50% of the value of the encryption operation is the same, the real estate transaction data control server R(C) correspondingly sets the value of the encryption operation as a proof information file storage data access code of the real estate transaction record storage data so as to finish a proof information encoding procedure of the real estate transaction record storage data;

in which the real estate transaction data control server R(C) activates the real estate transaction data operation server R(O) to finish the proof information encoding procedure of the real estate transaction record storage data of the operation verification data register so as to set a corresponding proof information file storage data access code of the real estate transaction record storage data;

in which the added proof information procedure includes a first added proof information procedure, a second added proof information procedure, a third added proof information procedure, a fourth added proof information procedure, and a fifth added proof information procedure;

in which the first added proof information procedure including the real estate transaction procedure control server R(C) stores the real estate transaction record storage data of the operation verification data register in the proof information record storage data register, sets a corresponding storage address as the proof information record storage data storage address of the real estate transaction record storage data, and sets the proof information record storage data access code of the real estate transaction record storage data and the proof information record storage data storage address as a proof information record storage data access address of the real estate transaction record storage data so as to finish the proof information storage record procedure of the real estate transaction record storage data;

in which after the real estate transaction procedure control server R(C) has finished the proof information storage record procedure of the real estate transaction record storage data of the operation verification data register, the real estate transaction procedure control server R(C) sets a corresponding proof information record storage data access address of the real estate transaction record storage data;

in which the real estate transaction procedure control server R(C) stores the proof information record storage data access address of the real estate transaction record storage data in the proof information record storage data storage address record table of the real estate transaction record proof information register;

in which the second added proof information procedure including the real estate transaction procedure control server R(C) sets the record storage data code of the real estate transaction record storage data and the proof information record storage data access code as a proof information record storage data access code of the real estate transaction record storage data to finish the proof information access code encoding procedure of the real estate transaction record storage data;

in which after the real estate transaction procedure control server R(C) has finished the proof information access code encoding procedure of the real estate transaction record storage data of the operation verification data register, the real estate transaction procedure control server R(C) sets a corresponding proof information record storage data access code of the real estate transaction record storage data;

in which the third added proof information procedure including the real estate transaction procedure control server R(C) sequentially sets a proof information serial number of the added real estate transaction record proof information based on a serial number of the real estate transaction record proof information stored in the real estate transaction record proof information table of the real estate transaction record proof information register, sets the information verification code of the last real estate transaction record proof information of the real estate transaction record proof information table as a proof information sequence verification code of the added real estate transaction record proof information, and sets the record storage data code as an information verification code of the added real estate transaction record proof information;

in which the fourth added proof information procedure including the real estate transaction procedure control server R(C) sets the proof information serial number of the added real estate transaction record proof information, the proof information sequence verification code, the information verification code, and the proof information record storage data access code of the real estate transaction record storage data as contents of the added real estate transaction record proof information and stores same in the real estate transaction record proof information table, and the added real estate transaction record proof information is the last real estate transaction record proof information of the real estate transaction record proof information table;

in which the real estate transaction record proof information of the real estate transaction record proof information table sequentially stores records in the real estate transaction record proof information table based on the set sequence of the real estate transaction record proof information, and creates a real estate transaction record proof information sequence;

in which the fifth added proof information procedure including the real estate transaction procedure control server R(C) sets the real estate transaction procedure serial number of the real estate transaction record storage data, the proof information serial number of the added real estate transaction record proof information, the proof information sequence verification code, and the record storage data code of the real estate transaction record storage data as a proof information record storage data index code of the real estate transaction record storage data so as to finish the proof information index encoding procedure of the real estate transaction record storage data;

in which after the real estate transaction procedure control server R(C) has finished the proof information index encoding procedure of the real estate transaction record storage data of the operation verification data register, the real estate transaction procedure control server R(C) sets a corresponding proof information record storage data index code of the real estate transaction record storage data, the real estate transaction procedure control server R(C) sends the proof information record storage data index code of the real estate transaction record storage data to the intelligent real estate transaction procedure management server C via the intranet, and stores same in the real estate transaction procedure proof information index table;

in which the intelligent real estate transaction procedure management server C analyzes the real estate transaction procedure serial number of the real estate transaction record storage data of the proof information record storage data index code based on the added real estate transaction record storage data in the real estate transaction procedure proof information index table and verifies that the real estate transaction procedure data register has the same real estate transaction procedure serial number, deletes data stored in the real estate transaction procedure data register, and sends the real estate transaction procedure serial number of the real estate transaction record storage data stored in the proof information record storage data index code of the added real estate transaction record storage data to the intelligent real estate transaction procedure platform server W;

in which the intelligent real estate transaction procedure platform server W analyzes the real estate transaction procedure serial number of the real estate transaction record storage data of the proof information record storage data index code based on the real estate transaction procedure serial number and verifies that the real estate transaction procedure of the intelligent real estate transaction procedure has the same real estate transaction procedure serial number, and sets the real estate transaction procedure as a finished data proof procedure;

in which the real estate transaction procedure is the real estate transaction application procedure, the real estate transaction investigation procedure, the real estate transaction appraisal procedure, the real estate transaction agreement procedure, the real estate transaction setting procedure, or the real estate transaction approval procedure;

in which the update proof information procedure includes a first updated proof information procedure and a second updated proof information procedure;

in which the first updated proof information procedure including the real estate transaction procedure control server R(C) sends the real estate transaction record storage data of the operation verification data register and the real estate transaction record proof information of the proof information record storage data access code of the real estate transaction record storage data via the intranet and stores same in the updated real estate transaction record proof information register of the real estate transaction procedure processing server R(P) and the updated real estate transaction record proof information register of the real estate transaction procedure operation server R(O), and the real estate transaction procedure control server R(C) deletes data stored in the operation verification data register;

in which the second updated proof information procedure including the real estate transaction procedure processing server R(P) stores the real estate transaction record storage data of the updated real estate transaction record proof information register in the proof information record storage data register, sets a corresponding storage address as a proof information record storage data storage address of the real estate transaction record storage data, sets the proof information record storage data access code of the real estate transaction record storage data and the proof information record storage data storage address as a proof information record storage data access address of the real estate transaction record storage data, and finishes the proof information storage record procedure of the real estate transaction record storage data;

in which after the real estate transaction procedure processing server R(P) has finished the proof information storage record procedure of the real estate transaction record storage data of the updated real estate transaction record proof information register, the real estate transaction procedure processing server R(P) sets a corresponding proof information record storage data access address of the real estate transaction record storage data;

in which the real estate transaction procedure processing server R(P) stores the proof information record storage data access address of the real estate transaction record storage data in the proof information record storage data storage address record table of the real estate transaction record proof information register, the real estate transaction procedure processing server R(P) sets the added real estate transaction record proof information of the updated real estate transaction record proof information register in the real estate transaction record proof information table of the real estate transaction record proof information register, and the added real estate transaction record proof information is the last real estate transaction record proof information of the real estate transaction record proof information table so as to finish the real estate transaction record proof information updating procedure of the real estate transaction procedure processing server R(P);

in which the real estate transaction record proof information of the real estate transaction record proof information table sequentially stores records in the real estate transaction record proof information table based on the set sequence of the real estate transaction record proof information and creates a real estate transaction record proof information sequence, and the real estate transaction procedure processing server R(P) deletes data stored in the updated real estate transaction record proof information register;

in which the real estate transaction procedure operation server R(O) stores the real estate transaction record storage data of the updated real estate transaction record proof information register in the proof information record storage data register and sets the corresponding storage address as a proof information record storage data storage address of the real estate transaction record storage data, and sets the proof information record storage data access code of the real estate transaction record storage data and the proof information record storage data storage address as the proof information record storage data access address of the real estate transaction record storage data so as to finish the proof information storage record procedure of the real estate transaction record storage data;

in which after the real estate transaction procedure operation server R(O) has finished the proof information storage record procedure of the real estate transaction record storage data of the updated real estate transaction record proof information register, the real estate transaction procedure operation server R(O) sets a corresponding proof information record storage data access address of the real estate transaction record storage data, the real estate transaction procedure operation server R(O) stores the proof information record storage data access address of the real estate transaction record storage data in the proof information record storage data storage address record table of the real estate transaction record proof information register, the real estate transaction procedure operation server R(O) sets the added real estate transaction record proof information of the updated real estate transaction record proof information register in the real estate transaction record proof information table of the real estate transaction record proof information register, and the added real estate transaction record proof information is the last real estate transaction record proof information of the real estate transaction record proof information table so as to finish the real estate transaction record proof information updating procedure of the real estate transaction procedure operation server R(O);

in which the real estate transaction record proof information of the real estate transaction record proof information table sequentially stores records in the real estate transaction record proof information table based on the set sequence of the real estate transaction record proof information and creates a real estate transaction record proof information sequence, and the real estate transaction procedure operation server R(O) deletes data stored in the updated real estate transaction record proof information register;

in which after the real estate transaction procedure processing server R(P) and the real estate transaction procedure operation server R(O) have finished the real estate transaction record proof information updating procedure respectively, the proof information updating procedure is finished;

in which contents of the real estate transaction record proof information table of the real estate transaction record proof information register of the real estate transaction procedure processing server R(P) and contents of the real estate transaction record proof information table of the real estate transaction record proof information register of the real estate transaction procedure operation server R(O) are the same as that of the real estate transaction record proof information table of the real estate transaction record proof information register of the real estate transaction procedure control server R(C) so as to simultaneously and synchronously update the real estate transaction file proof information table;

in which the user configured to connected to the intelligent real estate transaction procedure platform server W via the remote terminal T in order to click the real estate transaction procedure of the intelligent real estate transaction procedure of the finished data proof procedure which is set in the intelligent real estate transaction procedure platform server W;

in which the user is the real estate transaction procedure owner or the real estate transaction procedure participant of the real estate transaction procedure; and the real estate transaction procedure is the real estate transaction application procedure, the real estate transaction investigation procedure, the real estate transaction appraisal procedure, the real estate transaction agreement procedure, the real estate transaction setting procedure, or the real estate transaction approval procedure;

in which the intelligent real estate transaction procedure platform server W sends the real estate transaction procedure serial number of the real estate transaction procedure of the intelligent real estate transaction procedure of the finished data proof procedure to the intelligent real estate transaction procedure management server C;

in which the intelligent real estate transaction procedure management server C analyzes the real estate transaction procedure proof information index table based on the real estate transaction procedure serial number and verifies that the same stored in the real estate transaction procedure proof information index table has the same the proof information record storage data index code of the real estate transaction record storage data of the real estate transaction procedure serial number, and correspondingly stores same in the real estate transaction procedure data register having the same real estate transaction procedure serial number;

in which the intelligent real estate transaction procedure management server C sends the proof information record storage data index code of the real estate transaction record storage data to any of the real estate transaction procedure processing servers R(P) in a low operation storage work load via the intranet;

in which the real estate transaction procedure processing server R(P) accesses the corresponding real estate transaction record proof information stored in the real estate transaction record proof information table of the real estate transaction record proof information register based on the proof information serial number of the real estate transaction record proof information in the proof information record storage data index code of the real estate transaction record storage data, and analyzes same and verifies that the proof information sequence verification code of the real estate transaction record proof information is the same as the proof information sequence verification code of the real estate transaction record proof information in the proof information record storage data index code of the real estate transaction record storage data so as to confirm that the contents of the real estate transaction record proof information are not tampered with or changed;

in which the intelligent real estate transaction procedure management server C analyzes the real estate transaction procedure proof information index table based on the record storage data code of the real estate transaction record storage data in the proof information record storage data index code of the real estate transaction record storage data, and verifies that the same stored in the real estate transaction procedure proof information index table has the same proof information record storage data access code of the real estate transaction record storage data in the record storage data code of the real estate transaction record storage data;

in which the real estate transaction procedure processing server R(P) analyzes the real estate transaction procedure proof information index table based on the record storage data code of the real estate transaction record storage data in the proof information record storage data access code of the real estate transaction record storage data, and verifies that the same stored in the proof information record storage data storage address record table of the real estate transaction record proof information register has the same proof information record storage data access code of the real estate transaction record storage data in the proof information record storage data access code of the real estate transaction record storage data;

in which the real estate transaction procedure processing server R(P) accesses the real estate transaction record storage data stored in the proof information record storage data register based on the proof information record storage data storage address of the real estate transaction record storage data in the proof information record storage data access address of the real estate transaction record storage data, and decrypts the real estate transaction record storage data using a user's personal encryption and decryption data sequence so as to obtain the real estate transaction proof records and the proof information file storage data index code of the real estate transaction file storage data;

in which the real estate transaction record storage data is the real estate transaction application procedure record storage data, the real estate transaction investigation procedure record storage data, the real estate transaction appraisal procedure record storage data, the real estate transaction agreement procedure record storage data, the real estate transaction setting procedure record storage data, or the real estate transaction approval procedure record storage data;

in which the real estate transaction procedure processing server R(P) sends the real estate transaction proof records and the proof information file storage data index code of the real estate transaction file storage data to the intelligent real estate transaction procedure management server C based on the real estate transaction procedure serial number of the real estate transaction record storage data in the proof information record storage data index code of the real estate transaction record storage data, and stores the corresponding real estate transaction procedure data register store having the same real estate transaction procedure serial number;

in which the intelligent real estate transaction procedure management server C sends the proof information file storage data index code of the real estate transaction record storage data of the real estate transaction procedure data register to any of the real estate transaction data processing server F(P) in a low operation storage work load via the intranet;

in which the real estate transaction data processing server F(P) accesses the corresponding real estate transaction file proof information stored in the real estate transaction file proof information table of the real estate transaction file proof information register based on the proof information serial number of the real estate transaction file proof information in the proof information record storage data index code of the real estate transaction file storage data, and analyzes same and verifies that the proof information sequence verification code of the real estate transaction file proof information is the same as the proof information sequence verification code of the real estate transaction file proof information in the proof information record storage data index code of the real estate transaction file storage data so as to confirm that the contents of the real estate transaction file proof information are not tampered with or changed;

in which the real estate transaction data processing server F(P) analyzes the real estate transaction procedure proof information index table based on the record storage data code of the real estate transaction file storage data in the proof information record storage data index code of the real estate transaction file storage data, and verifies that the same stored in the real estate transaction procedure proof information index table has the same proof information record storage data access code of the real estate transaction file storage data in the record storage data code of the real estate transaction file storage data;

in which the real estate transaction data processing server F(P) analyzes the real estate transaction procedure proof information index table based on the proof information file storage data access code of the real estate transaction file storage data in the proof information record storage data index code of the real estate transaction file storage data, and verifies that the same stored in the proof information file storage data storage address record table of the real estate transaction file proof information register has the same proof information file storage data access code of the real estate transaction file storage data in the proof information file storage data access address of the real estate transaction file storage data;

in which the real estate transaction data processing server F(P) accesses the real estate transaction file storage data stored in the proof information file storage data register based on the proof information file storage data access address of the real estate transaction file storage data in the proof information file storage data access address of the real estate transaction file storage data, and decrypts the real estate transaction file storage data using a user's personal encryption and decryption data sequence so as to obtain the real estate transaction file division record table;

in which the real estate transaction file storage data is the real estate transaction application procedure file storage data, the real estate transaction investigation procedure file storage data, the real estate transaction appraisal procedure file storage data, the real estate transaction agreement procedure file storage data, the real estate transaction setting procedure file storage data, or the real estate transaction approval procedure file storage data;

in which the real estate transaction data processing server F(P) accesses the real estate transaction file division file stored in the real estate transaction file division file register of the real estate transaction data processing server F(P) based on the real estate transaction file division record of the real estate transaction file division record table so that the real estate transaction file division file is configured to convert to the real estate transaction proof file using a conversion procedure, and the real estate transaction data processing server F(P) uses the conversion procedure to obtain the corresponding real estate transaction proof file based on the real estate transaction file division record of the real estate transaction file division record table;

in which the real estate transaction data processing server F(P) sends the real estate transaction proof files to the intelligent real estate transaction procedure management server C based on the real estate transaction procedure serial number of the real estate transaction file storage data stored in the proof information file storage data index code of the real estate transaction file storage data, and stores the corresponding real estate transaction procedure data register having the same real estate transaction procedure serial number;

in which the intelligent real estate transaction procedure management server C sends the real estate transaction proof files of the real estate transaction procedure data register and the real estate transaction proof records to the intelligent real estate transaction procedure platform server W; and in which the intelligent real estate transaction procedure platform server W sends the real estate transaction proof files of the real estate transaction procedure and the real estate transaction proof records to the remote terminal T by performing the intelligent real estate transaction procedure of the finished data proof procedure which has been clicked by the user so that the user can review or print the real estate transaction proof files of the real estate transaction procedure and the real estate transaction proof records.

While the invention has been described in terms of preferred embodiments, those skilled in the art will recognize that the invention can be practiced with modifications within the spirit and scope of the appended claims.

What is claimed is:

1. A method of intelligently verifying real estate transaction procedure implemented in a system of intelligently verifying real estate transaction procedure, the system of intelligently verifying real estate transaction procedure including an intelligent real estate transaction procedure platform system and an intelligent real estate transaction procedure management system, the intelligent real estate transaction procedure platform system including an intelligent real estate transaction procedure platform server (W) and a plurality of remote terminals (T), the intelligent real estate transaction procedure management system including an intelligent real estate transaction procedure management server (C), a plurality of real estate transaction data processing servers F(P), a real estate transaction data control server F(C), a plurality of real estate transaction data operation servers F(O), a plurality of real estate transaction procedure processing servers R(P), a real estate transaction procedure control server R(C) and a plurality of real estate transaction procedure operation servers R(O), the intelligent real estate transaction procedure platform server (W) connected to the internet and connected to the intelligent real estate transaction procedure management server (C) via an intranet wherein the remote terminals (T) configured to connected to the intelligent real estate transaction procedure platform server (W) via the internet, the intelligent real estate transaction procedure management server (C), the real estate transaction data processing servers F(P), the real estate transaction data control server F(C), the real estate transaction data operation servers F(O), the real estate transaction procedure processing servers R(P), the real estate transaction procedure control servers R(C) and the real estate transaction procedure operation servers R(O) interconnected via the intranet, the intelligent real estate transaction procedure management server C including a real estate transaction procedure proof information index table and a plurality of real estate transaction procedure data registers wherein the real estate transaction procedure data registers include a plurality of real estate transaction application procedure data registers, a plurality of real estate transaction investigation procedure data registers, a plurality of real estate transaction appraisal procedure data registers, a plurality of real estate transaction agreement procedure data registers, a plurality of real estate transaction setting procedure data registers and a plurality of real estate transaction approval procedure data registers, the real estate transaction data processing server F(P) including a real estate transaction file register, a real estate transaction file division file register, a real estate transaction file division record register, a real estate transaction file proof information register to be updated, a proof information file storage data register, and a real estate transaction file proof information register wherein the real estate transaction file proof information register includes a proof information file storage data storage address record table and a real estate transaction file proof information table, the real estate transaction file proof information table including a plurality of real estate transaction file proof information, the real estate transaction data control server F(C) including a real estate transaction file storage data register, an operation verification data register, a proof information file storage data register, and a real estate transaction file proof information register wherein the real estate transaction file proof information register includes a proof information file storage data storage address record table and a real estate transaction file proof information table, the real estate transaction file proof information table including a plurality of real estate transaction file proof information, the real estate transaction data operation server F(O) including a real estate transaction file proof information register to be updated, a proof information file storage data register, and a real estate transaction file proof information register wherein the real estate transaction file proof information register includes a proof information file storage data storage address record table and a real estate transaction file proof information table, the real estate transaction file proof information table including real estate transaction file proof information, the real estate transaction procedure processing server R(P) including a real estate transaction record register, a real estate transaction record proof information register to be updated, a proof information record storage data register, and a real estate transaction record proof information register wherein the real estate transaction record proof information register includes a proof information record storage data storage address record table and a real estate transaction record proof information table, the real estate transaction record proof information table including real estate transaction record proof information, the real estate transaction procedure control server R(C) including a real estate transaction record storage data register, an operation verification data register, a proof information record storage data register, and a real estate transaction record proof information register wherein the real estate transaction record proof information register includes a proof information record storage data storage address record table and a real estate transaction record proof information table, the real estate transaction record proof information table including real estate transaction record proof information, the real estate transaction procedure operation server R(O) including a real estate transaction record proof information register to be updated, a proof information record storage data register, and a real estate transaction record proof information register wherein the real estate transaction record proof information register includes a proof information record storage data storage address record table and a real estate transaction record proof information table, and the real estate transaction record proof information table includes real estate transaction record proof information, the method of intelligently verifying real estate transaction procedure comprising steps of:

enabling a user to connect to the intelligent real estate transaction procedure platform server (W) via the remote terminal and the internet, log in the intelligent real estate transaction procedure platform server (W) to verify a user name and a password, and obtain platform system member rights to for data communications;

enabling the user to enter a real estate transaction procedure via the intelligent real estate transaction procedure platform server (W) wherein the intelligent real estate transaction procedure platform server provides a user privilege share encoding and decoding data sequence and a personal encoding and decoding data sequence based on a non-symmetrical encoding and decoding algorithm wherein the user is a buyer, a relative of the buyer, a lawyer, a real estate broker, a secretary, an appraisal specialist, or a bank employee; and enabling the user to set an intelligent real estate transaction procedure via the intelligent real estate transaction procedure platform server (W) so that the user becomes a real estate transaction procedure owner of an intelligent real estate transaction procedure;

wherein the intelligent real estate transaction procedure includes a plurality of real estate transaction procedures including a real estate transaction application procedure, a real estate transaction investigation procedure, a real estate transaction appraisal procedure, a real estate transaction agreement procedure, a real estate transaction setting procedure, and a real estate transaction approval procedure; and wherein the real estate transaction procedures of the intelligent real estate transaction procedure are performed sequentially;

wherein in performing one of the real estate transaction procedures of the intelligent real estate transaction procedure, the real estate transaction procedure owner sends a system confirmation notice of joining the real estate transaction procedure to another user via the intelligent real estate transaction procedure platform server (W) to invite another user to join the real estate transaction procedure, after another user's positive reply to the system confirmation notice of joining the real estate transaction procedure, another user becomes a real estate transaction procedure participant of the real estate transaction procedure wherein the real estate transaction procedure participant is allowed to only participate the invited real estate transaction procedure not other uninvited real estate transaction procedures;

wherein in performing the real estate transaction procedure, the real estate transaction procedure owner or the real estate transaction procedure participant uses a non-symmetrical encoding and decoding algorithm to encode or decode data to ensure real estate transaction data access privilege and data safety so that the real estate transaction procedure owner or the real estate transaction procedure participant uses a shared encoded data sequence to encode data and uses a shared decoded data sequence to decode data or a personal encoded data sequence to encode data and uses a personal decoded data sequence to decode data;

wherein the real estate transaction application procedure of the intelligent real estate transaction procedure uses the intelligent real estate transaction procedure platform server (W) to preset a plurality of real estate transaction files to be uploaded and a plurality of real estate transaction records to be loaded wherein the real estate transaction files to be uploaded include a real estate transaction application and a financial statement, the real estate transaction records to be uploaded include an application procedure text record and an application procedure real estate transaction information record;

wherein the real estate transaction investigation procedure uses the intelligent real estate transaction procedure platform server (W) to preset a plurality of real estate transaction files to be uploaded and a plurality of real estate transaction records to uploaded wherein the real estate transaction files to be uploaded includes a personal credit report, the real estate transaction records to be uploaded include an investigation procedure text record and an investigation procedure real estate transaction information record;

wherein the real estate transaction appraisal procedure uses the intelligent real estate transaction procedure platform server (W) to preset a plurality of real estate transaction files to be uploaded and a plurality of real estate transaction records to be uploaded wherein the real estate transaction files to be uploaded include a collateral appraisal report, the real estate transaction records to be uploaded include an appraisal procedure text record and an appraisal procedure real estate transaction information record;

wherein the real estate transaction agreement procedure uses the intelligent real estate transaction procedure platform server (W) to preset a plurality of real estate transaction files to be uploaded and a plurality of real estate transaction records to be uploaded wherein the real estate transaction files to be uploaded include a real estate transaction agreement, an identification document, a driver license, a license application, and a house certificate, the real estate transaction records to be uploaded include an agreement procedure text record and an agreement procedure real estate transaction information record;

wherein the real estate transaction setting procedure uses the intelligent real estate transaction procedure platform server (W) to preset a plurality of real estate transaction files to be uploaded and a plurality of real estate transaction records to be uploaded wherein the real estate transaction files to be uploaded include an asset security setting application and a house certificate, the real estate transaction records to be uploaded include a setting procedure text record and a setting procedure real estate transaction information record;

wherein the real estate transaction approval procedure uses the intelligent real estate transaction procedure platform server (W) to preset a plurality of real estate transaction files to be uploaded and a plurality of real estate transaction records to be uploaded wherein the real estate transaction files to be uploaded include a real estate transaction item transfer slip, the real estate transaction records to be uploaded include an approval procedure text record and an approval procedure real estate transaction information record;

wherein the real estate transaction procedure owner uses the intelligent real estate transaction procedure platform server (W) to add or delete the preset real estate transaction files to be uploaded in order to add or delete the real estate transaction file to be uploaded with respect to one of the real estate transaction procedures of the intelligent real estate transaction procedure, or add or delete the preset uploaded real estate transaction records to be uploaded in order to add or delete the real estate transaction records to be uploaded;

wherein in a process the real estate transaction application procedure of the intelligent real estate transaction procedure uploads the real estate transaction files to be uploaded or the real estate transaction records to be uploaded to the intelligent real estate transaction procedure platform server (W) via the real estate transaction procedure owner or the real estate transaction procedure participant of the real estate transaction application procedure, the intelligent real estate transaction procedure platform server (W) sends same to the real estate transaction application procedure data register set by the intelligent real estate transaction procedure management server (C) via the intranet, and stores the real estate transaction files to be uploaded as real estate transaction proof files or store the real estate transaction records to be uploaded as real estate transaction proof records;

wherein the real estate transaction application procedure uploads the real estate transaction files to be uploaded and the real estate transaction records to be uploaded to the real estate transaction application procedure data register of the intelligent real estate transaction procedure management server (C) and stores the corresponding real estate transaction proof files and the real estate transaction proof records, the real estate transaction procedure participant of the real estate transaction procedure owner or the real estate transaction application procedure checks the real estate transaction proof files and the real estate transaction proof records, and if it is correct the real estate transaction procedure participant of the real estate transaction procedure owner or the real estate transaction application procedure issues a confirmation notice of finishing the real estate transaction procedure;

wherein after all of the real estate transaction procedure participants and the real estate transaction procedure owners of the real estate transaction application procedure have issued the confirmation notice of finishing the real estate transaction procedure, the real estate transaction application procedure is finished; the intelligent real estate transaction procedure management server (C) sets a corresponding real estate transaction procedure serial number of the real estate transaction application procedure data register and sends the real estate transaction procedure serial number to the intelligent real estate transaction procedure platform server (W), the intelligent real estate transaction procedure platform server (W) sets the real estate transaction procedure serial number as a real estate transaction procedure serial number of the real estate transaction application procedure of the intelligent real estate transaction procedure; wherein in a process the real estate transaction investigation procedure of the intelligent real estate transaction procedure, the real estate transaction files to be uploaded or the real estate transaction records to be uploaded of the real estate transaction investigation procedure are sent to the intelligent real estate transaction procedure platform server (W) via the real estate transaction procedure participant of the real estate transaction procedure owner or the real estate transaction investigation procedure, the intelligent real estate transaction procedure platform server (W) sends same to the real estate transaction investigation procedure data register of the intelligent real estate transaction procedure management server (C) via the intranet, stores the real estate transaction files to be uploaded as real estate transaction proof files or stores the real estate transaction records to be uploaded as real estate transaction proof records;

wherein after the real estate transaction files to be uploaded and the real estate transaction records to be uploaded have been uploaded to the real estate transaction investigation procedure data register of the intelligent real estate transaction procedure management server (C), the real estate transaction investigation procedure stores them as the real estate transaction proof files and the real estate transaction proof records, the real estate transaction procedure owner or the real estate transaction procedure participant of the real estate transaction investigation procedure checks the real estate transaction proof files and the real estate transaction proof records, and if it is correct, the real estate transaction procedure owner or the real estate transaction procedure participant of the real estate transaction investigation procedure sends a confirmation notice of finishing the real estate transaction procedure, after all of the real estate transaction procedure participants and the real estate transaction procedure owners of the real estate transaction investigation procedure have sent the confirmation notice of finishing the real estate transaction procedure, the real estate transaction investigation procedure is finished, the intelligent real estate transaction procedure management server (C) sets a corresponding real estate transaction procedure serial number with respect to the real estate transaction investigation procedure data register, sends the real estate transaction procedure serial number to the intelligent real estate transaction procedure platform server (W), the intelligent real estate transaction procedure platform server (W) sends the real estate transaction procedure serial number as a real estate transaction procedure serial number of the real estate transaction investigation procedure of the intelligent real estate transaction procedure;

wherein in a process the real estate transaction appraisal procedure of the intelligent real estate transaction procedure uploads the real estate transaction files to be uploaded and the real estate transaction records to be uploaded to the intelligent real estate transaction procedure platform server (W) via the real estate transaction procedure owner or the real estate transaction procedure participant the real estate transaction appraisal procedure, the intelligent real estate transaction procedure platform server (W) sends same to the corresponding real estate transaction appraisal procedure data register of the intelligent real estate transaction procedure management server (C) via the intranet, and stores the real estate transaction files to be uploaded as real estate transaction proof files or stores the real estate transaction records to be uploaded as real estate transaction proof records;

wherein after the real estate transaction appraisal procedure has uploaded the real estate transaction files to be uploaded and the real estate transaction records to be uploaded to the real estate transaction appraisal procedure data register of the intelligent real estate transaction procedure management server (C) and has stored same as real estate transaction proof files and real estate transaction proof records, the real estate transaction procedure owner or the real estate transaction procedure participant of the real estate transaction appraisal procedure checks the real estate transaction proof files and the real estate transaction proof records, and if it is correct, the real estate transaction procedure owner or the real estate transaction procedure participant of the real estate transaction appraisal procedure issues a confirmation notice of finishing the real estate transaction procedure;

wherein after all of the real estate transaction procedure participants and the real estate transaction procedure owners of the real estate transaction appraisal procedure have sent the confirmation notice of finishing the real estate transaction procedure, the real estate transaction appraisal procedure is finished, the intelligent real estate transaction procedure management server (C) sets a corresponding real estate transaction procedure serial number with respect to the real estate transaction appraisal procedure data register and sends the real estate transaction procedure serial number to the intelligent real estate transaction procedure platform server (W), and the intelligent real estate transaction procedure platform server (W) sets the real estate transaction procedure serial number as a real estate transaction procedure serial number of the real estate transaction appraisal procedure of the intelligent real estate transaction procedure;

wherein in a process the real estate transaction agreement procedure of the intelligent real estate transaction procedure uploads the real estate transaction files to be uploaded or the real estate transaction records to be uploaded to the intelligent real estate transaction procedure platform server (W) via the real estate transaction procedure owner or the real estate transaction procedure participant of the real estate transaction agreement procedure, the intelligent real estate transaction procedure platform server (W) sends same to a corresponding real estate transaction agreement procedure data register of the intelligent real estate transaction procedure management server (C) via the intranet, and stores the real estate transaction files to be uploaded as real estate transaction proof files or stores the real estate transaction records to be uploaded as real estate transaction proof records;

wherein after the real estate transaction agreement procedure has uploaded the real estate transaction files to be uploaded and the real estate transaction records to be uploaded to the real estate transaction agreement procedure data register of the intelligent real estate transaction procedure management server (C) and has stored same as real estate transaction proof files and real estate transaction proof records, the real estate transaction procedure owner or the real estate transaction procedure participant of the real estate transaction agreement procedure checks the real estate transaction proof files and the real estate transaction proof records, and if it is correct, the real estate transaction procedure owner or the real estate transaction procedure participant of the real estate transaction agreement procedure issues a confirmation notice of finishing the real estate transaction procedure;

wherein after all of the real estate transaction procedure participants and the real estate transaction procedure owners of the real estate transaction agreement procedure have sent the confirmation notice of finishing the real estate transaction procedure, the real estate transaction agreement procedure is finished, the intelligent real estate transaction procedure management server (C) sets a corresponding real estate transaction procedure serial number with respect to the real estate transaction agreement procedure data register and sends the real estate transaction procedure serial number to the intelligent real estate transaction procedure platform server (W), and the intelligent real estate transaction procedure platform server (W) sets the real estate transaction procedure serial number as a real estate transaction procedure serial number of the real estate transaction agreement procedure of the intelligent real estate transaction procedure;

wherein in a process the real estate transaction setting procedure of the intelligent real estate transaction procedure uploads the real estate transaction files to be uploaded or the real estate transaction records to be uploaded to the intelligent real estate transaction procedure platform server (W) via the real estate transaction procedure owner or the real estate transaction procedure participant of the real estate transaction setting procedure, the intelligent real estate transaction procedure platform server (W) sends same to the corresponding real estate transaction setting procedure data register of the intelligent real estate transaction procedure management server (C) via the intranet, and stores the real estate transaction files to be uploaded as real estate transaction proof files or stores the real estate transaction records to be uploaded as real estate transaction proof records;

wherein after the real estate transaction setting procedure has uploaded the real estate transaction files to be uploaded and the real estate transaction records to be uploaded to the real estate transaction setting procedure data register of the intelligent real estate transaction procedure management server (C) and has stored same as real estate transaction proof files and real estate transaction proof records, the real estate transaction procedure owner or the real estate transaction procedure participant of the real estate transaction setting procedure checks the real estate transaction proof files and the real estate transaction proof records, and if it is correct, the real estate transaction procedure owner or the real estate transaction procedure participant of the real estate transaction setting procedure issues a confirmation notice of finishing the real estate transaction procedure;

wherein after all of the real estate transaction procedure participants and the real estate transaction procedure owners of the real estate transaction setting procedure have sent the confirmation notice of finishing the real estate transaction procedure, the real estate transaction setting procedure is finished, the intelligent real estate transaction procedure management server (C) sets a corresponding real estate transaction procedure serial number with respect to the real estate transaction setting procedure data register and sends the real estate transaction procedure serial number to the intelligent real estate transaction procedure platform server (W), and the intelligent real estate transaction procedure platform server (W) sets the real estate transaction procedure serial number as a real estate transaction procedure serial number of the real estate transaction setting procedure of the intelligent real estate transaction procedure;

wherein in a process the real estate transaction approval procedure of the intelligent real estate transaction procedure uploads the real estate transaction files to be uploaded or the real estate transaction records to be uploaded to the intelligent real estate transaction procedure platform server (W) via the real estate transaction procedure owner or the real estate transaction procedure participant of the real estate transaction approval procedure, the intelligent real estate transaction procedure platform server (W) sends same to the corresponding real estate transaction approval procedure data register of the intelligent real estate transaction procedure management server (C) via the intranet, and stores the real estate transaction files to be uploaded as real estate transaction proof files or stores the real estate transaction records to be uploaded as real estate transaction proof records;

wherein after the real estate transaction approval procedure has uploaded the real estate transaction files to be uploaded and the real estate transaction records to be uploaded to the real estate transaction approval procedure data register of the intelligent real estate transaction procedure management server (C) and has stored same as real estate transaction proof files and real estate transaction proof records, the real estate transaction procedure owner or the real estate transaction procedure participant of the real estate transaction approval procedure checks the real estate transaction proof files and the real estate transaction proof records, and if it is correct, the real estate transaction procedure owner or the real estate transaction procedure participant of the real estate transaction approval procedure issues a confirmation notice of finishing the real estate transaction procedure;

wherein after all of the real estate transaction procedure participants and the real estate transaction procedure owners of the real estate transaction approval procedure have sent the confirmation notice of finishing the real estate transaction procedure, the real estate transaction approval procedure is finished, the intelligent real estate transaction procedure management server (C) sets a corresponding real estate transaction procedure serial number with respect to the real estate transaction approval procedure data register and sends the real estate transaction procedure serial number to the intelligent real estate transaction procedure platform server (W), and the intelligent real estate transaction procedure platform server (W) sets the real estate transaction procedure serial number as a real estate transaction procedure serial number of the real estate transaction approval procedure of the intelligent real estate transaction procedure;

wherein the intelligent real estate transaction procedure management server (C) sends the real estate transaction procedure serial number of the real estate transaction application procedure data register and the real estate transaction proof files to any of the real estate transaction data processing servers F(P) in a low operation storage work load via the intranet and stores same in the real estate transaction file register;

wherein the real estate transaction data processing server F(P) performs a file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs a file encryption storage procedure on the real estate transaction file division record table so that a shared encryption and decryption data sequence of the real estate transaction procedure owner and each real estate transaction procedure participant of the real estate transaction application procedure are used to perform a data encryption storage of the real estate transaction file division record table and create a corresponding real estate transaction application procedure file storage data, further sends same from the real estate transaction application procedure file storage data to the real estate transaction data control server F(C) via the intranet and stores same in the real estate transaction file storage data register wherein the real estate transaction data processing server F(P) sets a corresponding real estate transaction procedure serial number of the real estate transaction application procedure file storage data based on the real estate transaction procedure serial number of the real estate transaction application procedure data register, and the real estate transaction data processing server F(P) deletes data stored in both the real estate transaction file register and the real estate transaction file division record register;

wherein the intelligent real estate transaction procedure management server (C) sends the real estate transaction procedure serial number and the real estate transaction proof files of the real estate transaction investigation procedure data register to any of the real estate transaction data processing servers F(P) in a low operation storage work load via the intranet and stores same in the real estate transaction file register;

wherein the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction investigation procedure are used to perform a data encryption storage of the real estate transaction file division record table, create a corresponding real estate transaction investigation procedure file storage data, send the real estate transaction investigation procedure file storage data to the real estate transaction data control server F(C) via the intranet, and store same in the real estate transaction file storage data register wherein the real estate transaction data processing server F(P) sets a corresponding real estate transaction procedure serial number of the real estate transaction investigation procedure file storage data based on the real estate transaction procedure serial number of the real estate transaction investigation procedure data register, and the real estate transaction data processing server F(P) deletes data stored in both the real estate transaction file register and the real estate transaction file division record register;

wherein the intelligent real estate transaction procedure management server (C) sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

wherein the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs a file encryption storage procedure on the real estate transaction file division record table so that a shared encryption and decryption data sequence of the real estate transaction procedure owner and each real estate transaction procedure participant of the real estate transaction application procedure are used to perform a data encryption storage of the real estate transaction file division record table and create a corresponding real estate transaction application procedure file storage data, further sends same from the real estate transaction application procedure file storage data to the real estate transaction data control server F(C) via the intranet and stores same in the real estate transaction file storage data register wherein the real estate transaction data processing server F(P) sets a corresponding real estate transaction procedure serial number of the real estate transaction application procedure file storage data based on the real estate transaction procedure serial number of the real estate transaction application procedure data register, and the real estate transaction data processing server F(P) deletes data stored in both the real estate transaction file register and the real estate transaction file division record register;

wherein the intelligent real estate transaction procedure management server (C) sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

wherein the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction investigation procedure are used to perform a data encryption storage of the real estate transaction file division record table, create a corresponding real estate transaction investigation procedure file storage data, send the real estate transaction investigation procedure file storage data to the real estate transaction data control server F(C) via the intranet, and store same in the real estate transaction file storage data register wherein the real estate transaction data processing server F(P) sets a corresponding real estate transaction procedure serial number of the real estate transaction investigation procedure file storage data based on the real estate transaction procedure serial number of the real estate transaction investigation procedure data register, and the real estate transaction data processing server F(P) deletes data stored in both the real estate transaction file register and the real estate transaction file division record register;

wherein the intelligent real estate transaction procedure management server (C) sends the real estate transaction procedure serial number of the real estate transaction appraisal procedure data register and the real estate transaction proof files to any of the real estate transaction data processing servers F(P) in a low operation storage work load via the intranet and stores same in the real estate transaction file register;

wherein the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction setting procedure are used to perform a data encryption storage of the real estate transaction file division record table, create a corresponding real estate transaction setting procedure file storage data, send the real estate transaction setting procedure file storage data to the real estate transaction data control server F(C) via the intranet, and store same in the real estate transaction file storage data register wherein the real estate transaction data processing server F(P) sets a corresponding real estate transaction procedure serial number of the real estate transaction setting procedure file storage data based on the real estate transaction procedure serial number of the real estate transaction setting procedure data register, and the real estate transaction data processing server F(P) deletes data stored in both the real estate transaction file register and the real estate transaction file division record register;

wherein the intelligent real estate transaction procedure management server (C) sends the real estate transaction procedure serial number of the real estate transaction approval procedure data register and the real estate transaction proof files to any of the real estate transaction data processing servers F(P) in a low operation storage work load via the intranet and stores same in the real estate transaction file register;

wherein the real estate transaction data processing server F(P) performs the file division storage procedure on the real estate transaction proof files stored in the real estate transaction file register to divide the real estate transaction proof files into a plurality of real estate transaction files and stores same in the real estate transaction file division file register of each of other real estate transaction data processing servers F(P), and creates a corresponding real estate transaction file division record and stores same in the real estate transaction file division record register;

wherein after the real estate transaction data processing server F(P) has performed the file division storage procedure on the real estate transaction proof files stored in the real estate transaction file register, the real estate transaction data processing server F(P) creates a corresponding real estate transaction file division record table based on the real estate transaction file division record of the real estate transaction file division record register, the real estate transaction data processing server F(P) performs the file encryption storage procedure on the real estate transaction file division record table so that the shared encryption and decryption data sequence of the real estate transaction procedure owner and each of the real estate transaction procedure participants of the real estate transaction approval procedure are used to perform a data encryption storage of the real estate transaction file division record table, create a corresponding real estate transaction approval procedure file storage data, send the real estate transaction approval procedure file storage data to the real estate transaction data control server F(C) via the intranet, and store same in the real estate transaction file storage data register;

wherein the real estate transaction data processing server F(P) sets a corresponding real estate transaction procedure serial number of the real estate transaction approval procedure file storage data based on the real estate transaction procedure serial number of the real estate transaction approval procedure data register, and the real estate transaction data processing server F(P) deletes data stored in both the real estate transaction file register and the real estate transaction file division record register;

wherein the real estate transaction file storage data register of the real estate transaction data control server F(C) stores real estate transaction file storage data wherein the real estate transaction file storage data is the real estate transaction application procedure file storage data, the real estate transaction investigation procedure file storage data, the real estate transaction appraisal procedure file storage data, the real estate transaction agreement procedure file storage data, the real estate transaction setting procedure file storage data or the real estate transaction approval procedure file storage data;

wherein the real estate transaction data control server F(C) sequentially accesses the real estate transaction file storage data stored in the real estate transaction file storage data register based on operation execution sequence of data operation verification period operation of the system and operation data and stores same in the operation verification data register, and in the data operation verification period, the real estate transaction data control server F(C) sequentially performs a storage data operation verification procedure, an added proof information procedure, and an updated proof information procedure on the real estate transaction file storage data stored in the operation verification data register;

wherein the storage data operation verification procedure includes a first storage data operation verification procedure, a second storage data operation verification procedure, and a third storage data operation verification procedure;

wherein the first storage data operation verification procedure including the real estate transaction data control server F(C) sends the real estate transaction file storage data of the operation verification data register to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

wherein the real estate transaction data control server F(C) analyzes same and verifies that at least 50% of the value of the encryption operation is the same, the real estate transaction data control server F(C) correspondingly sets the value of the encryption operation as a file storage data operation code of the real estate transaction file storage data so as to finish an encoding procedure of the storage data of the real estate transaction file storage data;

wherein the real estate transaction data control server F(C) activates the real estate transaction data operation server F(O) to finish the storage data encoding procedure of the real estate transaction file storage data of the operation verification data register so as to set a corresponding file storage data operation code of the real estate transaction file storage data;

wherein the second storage data operation verification procedure including the real estate transaction data control server F(C) sends the file storage data operation code of the real estate transaction file storage data to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

wherein the real estate transaction data control server F(C) analyzes same and verifies that at least 50% of the value of the encryption operation is the same, the real estate transaction data control server F(C) correspondingly sets the value of the encryption operation as a file storage data code of the real estate transaction file storage data so as to finish an encoding procedure of the storage data of the real estate transaction file storage data;

wherein the third storage data operation verification procedure including the real estate transaction data control server F(C) sends the file storage data code and the file storage data operation code of the real estate transaction file storage data to the real estate transaction data operation server F(O), the real estate transaction data operation server F(O) performs a data encryption operation on the real estate transaction file storage data based on a system setting data encryption algorithm, and sends a value of the completed encryption operation to the real estate transaction data control server F(C);

wherein the real estate transaction data control server F(C) analyzes same and verifies that at least 50% of the value of the encryption operation is the same, the real estate transaction data control server F(C) correspondingly sets the value of the encryption operation as a proof information file storage data access code of the real estate transaction file storage data so as to finish a proof information encoding procedure of the real estate transaction file storage data;

wherein the real estate transaction data control server F(C) activates the real estate transaction data operation server F(O) to finish the proof information encoding procedure of the real estate transaction file storage data of the operation verification data register so as to set a corresponding proof information file storage data access code of the real estate transaction file storage data;

wherein the added proof information procedure includes a first added proof information procedure, a second added proof information procedure, a third added proof information procedure, a fourth added proof information procedure, and a fifth added proof information procedure;

wherein the first added proof information procedure including the real estate transaction data control server F(C) stores the real estate transaction file storage data of the operation verification data register in the proof information file storage data register, sets a corresponding storage address as a proof information file storage data storage address of the real estate transaction file storage data, uses the proof information file storage data access code of the real estate transaction file storage data and the proof information file storage data storage address to set a proof information file storage data access address of the real estate transaction file storage data so as to finish the proof information storage record procedure of the real estate transaction file storage data;

wherein after the real estate transaction data control server F(C) has finished the proof information storage record procedure of the real estate transaction file storage data of the operation verification data register, the real estate transaction data control server F(C) sets a corresponding proof information file storage data access address of the real estate transaction file storage data, and uses the proof information file storage data access address of the real estate transaction file storage data to create a storage record in the proof information file storage data storage address record table of the real estate transaction file proof information register;

wherein the second added proof information procedure including the real estate transaction data control server F(C) sets the file storage data operation code of the real estate transaction file storage data and the proof information file storage data access code as a proof information file storage data access code of the real estate transaction file storage data to finish the proof information access code encoding procedure of the real estate transaction file storage data;

wherein after the real estate transaction data control server F(C) has finished the proof information access code encoding procedure of the real estate transaction file storage data of the operation verification data register, the real estate transaction data control server F(C) sets a corresponding proof information file storage data access code of the real estate transaction file storage data;

wherein the third added proof information procedure including the real estate transaction data control server F(C) sequentially sets a proof information serial number of the real estate transaction file proof information based on a serial number of a storage record in the real estate transaction file proof information of the real estate transaction file proof information table of the real estate transaction file proof information register, and sets an information verification code of the last real estate transaction file proof information of the real estate transaction file proof information table as a proof information sequence verification code of the real estate transaction file proof information, and sets the file storage data code as an information verification code of the real estate transaction file proof information;

wherein the fourth added proof information procedure including the real estate transaction data control server F(C) sets the proof information serial number of the real estate transaction file proof information, the proof information sequence verification code, the information verification code, and the proof information file storage data access code of the real estate transaction file storage data as contents of the real estate transaction file proof information, and stores same in the real estate transaction file proof information table, and the real estate transaction file proof information is the last real estate transaction file proof information of the real estate transaction file proof information table;

wherein the real estate transaction file proof information of the real estate transaction file proof information table sequentially stores a record in the real estate transaction file proof information table based on the set sequence of the real estate transaction file proof information, and creates a real estate transaction file proof information sequence;

wherein the fifth added proof information procedure including the real estate transaction data control server F(C) sets the real estate transaction procedure serial number of the real estate transaction file storage data, the proof information serial number of the real estate transaction file proof information, the proof information sequence verification code, and the file storage data operation code of the real estate transaction file storage data as a proof information file storage data index code of the real estate transaction file storage data to finish proof information index encoding procedure of the real estate transaction file storage data;

wherein after the real estate transaction data control server F(C) has finished the real estate transaction file storage data of the proof information index encoding procedure of the operation verification data register, the real estate transaction data control server F(C) sets a corresponding proof information file storage data index code of the real estate transaction file storage data, and sends the proof information file storage data index code of the real estate transaction file storage data to the intelligent real estate transaction procedure management server (C) via the intranet;

wherein the intelligent real estate transaction procedure management server (C) analyzes the real estate transaction procedure serial number of the real estate transaction file storage data of the proof information file storage data index code based on the real estate transaction file storage data to verify that the real estate transaction procedure data register has same real estate transaction procedure serial number, stores the proof information file storage data index code of the real estate transaction file storage data in the real estate transaction procedure data register, and stores the proof information file storage data index code of the real estate transaction file storage data in the corresponding real estate transaction procedure data register;

wherein the real estate transaction procedure data register is the real estate transaction application procedure data register, the real estate transaction investigation procedure data register, the real estate transaction appraisal procedure data register, the real estate transaction agreement procedure data register, the real estate transaction setting procedure data register, or the real estate transaction approval procedure data register;

wherein the updated proof information procedure includes a first updated proof information procedure and a second updated proof information procedure;

wherein the first updated proof information procedure including the real estate transaction data control server F(C) sends the real estate transaction file storage data of the operation verification data register, the proof information file storage data access code of the real estate transaction file storage data, and the real estate transaction file proof information to the real estate transaction data processing server F(P) via the intranet, and stores same in both the updated real estate transaction file proof information register of the real estate transaction data processing server F(P) and the updated real estate transaction file proof information register of the real estate transaction data operation server F(O); and the real estate transaction data control server F(C) deletes data stored in the operation verification data register;

wherein the second updated proof information procedure including the real estate transaction data processing server F(P) stores the real estate transaction file storage data of the updated real estate transaction file proof information register in the proof information file storage data register, sets a corresponding storage address as a proof information file storage data storage address of the real estate transaction file storage data, sets the proof information file storage data access code of the real estate transaction file storage data and the proof information file storage data storage address as a proof information file storage data access address of the real estate transaction file storage data, and finishes proof information storage record procedure of the real estate transaction file storage data;

wherein after the real estate transaction data processing server F(P) has finished the proof information storage record procedure of the real estate transaction file storage data of the updated real estate transaction file proof information register, the real estate transaction data processing server F(P) sets a corresponding proof information file storage data access address of the real estate transaction file storage data;

wherein the real estate transaction data processing server F(P) stores the proof information file storage data access address of the real estate transaction file storage data in the proof information file storage data storage address record table of the real estate transaction file proof information register;

wherein the real estate transaction data processing server F(P) sets the real estate transaction file proof information of the updated real estate transaction file proof information register in the real estate transaction file proof information table of the real estate transaction file proof information register, the real estate transaction file proof information is the last real estate transaction file proof information of the real estate transaction file proof information table, and finishes the real estate transaction file proof information updating procedure;

wherein the real estate transaction file proof information of the real estate transaction file proof information table is sequentially stored in the real estate transaction file proof information table based on the set sequence of the real estate transaction file proof information, creates a real estate transaction file proof information sequence, and the real estate transaction data processing server F(P) deletes data stored in the updated real estate transaction file proof information register;

wherein the real estate transaction data operation server F(O) stores the real estate transaction file storage data of the updated real estate transaction file proof information register in the proof information file storage data register, sets a corresponding storage address as a proof information file storage data storage address of the real estate transaction file storage data, sets the proof information file storage data access code of the real estate transaction file storage data and the proof information file storage data storage address as a proof information file storage data access address of the real estate transaction file storage data, and finishes the proof information storage record procedure of the real estate transaction file storage data;

wherein after the real estate transaction data operation server F(O) has finished the real estate transaction file storage data of the proof information storage record procedure of the updated real estate transaction file proof information register, the real estate transaction data operation server F(O) sets a corresponding proof information file storage data access address of the real estate transaction file storage data, and stores the proof information file storage data access address of the real estate transaction file storage data in the proof information file storage data storage address record table of the real estate transaction file proof information register;

wherein the real estate transaction data operation server F(O) sets the real estate transaction file proof information of the updated real estate transaction file proof information register in the real estate transaction file proof information table of the real estate transaction file proof information register, the real estate transaction file proof information is the last real estate transaction file proof information of the real estate transaction file proof information table, and finishes the real estate transaction file proof information updating procedure;

wherein the real estate transaction file proof information of the real estate transaction file proof information table is sequentially stored in the real estate transaction file proof information table based on the set sequence of the real estate transaction file proof information, creates a real estate transaction file proof information sequence, and the real estate transaction data processing server F(P) deletes data stored in the updated real estate transaction file proof information register;

wherein after the real estate transaction data processing server F(P) and the real estate transaction data operation server F(O) has finished the real estate transaction file proof information updating procedure respectively, the proof information procedure is updated;

wherein contents of the real estate transaction file proof information table of the real estate transaction file proof information register of the real estate transaction data processing server F(P) and contents of the real estate transaction file proof information table of the real estate transaction file proof information register of the real estate transaction data operation server F(O) are the same as that of the real estate transaction file proof information table of the real estate transaction file proof information register of the real estate transaction data control server F(C) so as to simultaneously and synchronously update the real estate transaction file proof information table;

wherein the intelligent real estate transaction procedure management server (C) sends the real estate transaction procedure serial number of the real estate transaction application procedure data register, the real estate transaction proof records and the proof information file storage data index code of the real estate transaction application procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction application procedure file storage data so that a shared encryption and decryption data sequence of the real estate transaction procedure owner and each real estate transaction procedure participant of the real estate transaction application procedure are used to perform a data encryption storage of the real estate transaction proof records and the proof information file storage data index code of the real estate transaction application procedure file storage data and create a corresponding real estate transaction application procedure record storage data; and further sends same from the real estate transaction application procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction application procedure record storage data based on the real estate transaction procedure serial number of the real estate transaction application procedure data register, and the real estate transaction procedure processing server R(P) deletes data stored in the real estate transaction record register;

wherein the intelligent real estate transaction procedure management server (C) sends the real estate transaction procedure serial number of the real estate transaction investigation procedure data register, the real estate transaction proof records and the proof information file storage data index code of the real estate transaction investigation procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction investigation procedure file storage data so that a shared encryption and decryption data sequence of the real estate transaction procedure owner and each real estate transaction procedure participant of the real estate transaction application procedure are used to perform a data encryption storage of the real estate transaction proof records and the proof information file storage data index code of the real estate transaction investigation procedure file storage data and create a corresponding real estate transaction investigation procedure record storage data; and further sends same from the real estate transaction investigation procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction investigation procedure record storage data based on the real estate transaction procedure serial number of the real estate transaction investigation procedure data register, and the real estate transaction procedure processing server R(P) deletes data stored in the real estate transaction record register;

wherein the intelligent real estate transaction procedure management server (C) sends the real estate transaction procedure serial number of the real estate transaction appraisal procedure data register, the real estate transaction proof records and the proof information file storage data index code of the real estate transaction appraisal procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction appraisal procedure file storage data so that a shared encryption and decryption data sequence of the real estate transaction procedure owner and each real estate transaction procedure participant of the real estate transaction appraisal procedure are used to perform a data encryption storage of the real estate transaction proof records and the proof information file storage data index code of the real estate transaction appraisal procedure file storage data and create a corresponding real estate transaction appraisal procedure record storage data; and further sends same from the real estate transaction appraisal procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction appraisal procedure record storage data based on the real estate transaction procedure serial number of the real estate transaction appraisal procedure data register, and the real estate transaction procedure processing server R(P) deletes data stored in the real estate transaction record register;

wherein the intelligent real estate transaction procedure management server (C) sends the real estate transaction procedure serial number of the real estate transaction agreement procedure data register, the real estate transaction proof records and the proof information file storage data index code of the real estate transaction agreement procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction agreement procedure file storage data so that a shared encryption and decryption data sequence of the real estate transaction procedure owner and each real estate transaction procedure participant of the real estate transaction agreement procedure are used to perform a data encryption storage of the real estate transaction proof records and the proof information file storage data index code of the real estate transaction agreement procedure file storage data and create a corresponding real estate transaction agreement procedure record storage data; and further sends same from the real estate transaction agreement procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction agreement procedure record storage data based on the real estate transaction procedure serial number of the real estate transaction agreement procedure data register, and the real estate transaction procedure processing server R(P) deletes data stored in the real estate transaction record register;

wherein the intelligent real estate transaction procedure management server (C) sends the real estate transaction procedure serial number of the real estate transaction setting procedure data register, the real estate transaction proof records and the proof information file storage data index code of the real estate transaction setting procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction setting procedure file storage data so that a shared encryption and decryption data sequence of the real estate transaction procedure owner and each real estate transaction procedure participant of the real estate transaction setting procedure are used to perform a data encryption storage of the real estate transaction proof records and the proof information file storage data index code of the real estate transaction setting procedure file storage data and create a corresponding real estate transaction setting procedure record storage data; and further sends same from the real estate transaction setting procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction setting procedure record storage data based on the real estate transaction procedure serial number of the real estate transaction setting procedure data register, and the real estate transaction procedure processing server R(P) deletes data stored in the real estate transaction record register;

wherein the intelligent real estate transaction procedure management server (C) sends the real estate transaction procedure serial number of the real estate transaction approval procedure data register, the real estate transaction proof records and the proof information file storage data index code of the real estate transaction approval procedure file storage data to any of the real estate transaction procedure data processing servers R(P) in a low operation storage work load via the intranet and stores same in the real estate transaction record register;

wherein the real estate transaction procedure processing server R(P) performs a record encryption storage procedure on the real estate transaction proof records of the real estate transaction record register and the proof information file storage data index code of the real estate transaction approval procedure file storage data so that a shared encryption and decryption data sequence of the real estate transaction procedure owner and each real estate transaction procedure participant of the real estate transaction approval procedure are used to perform a data encryption storage of the real estate transaction proof records and the proof information file storage data index code of the real estate transaction approval procedure file storage data and create a corresponding real estate transaction approval procedure record storage data; and further sends same from the real estate transaction approval procedure record storage data to the real estate transaction data control server R(C) via the intranet and stores same in the real estate transaction record storage data register;

wherein the real estate transaction procedure processing server R(P) sets a corresponding real estate transaction procedure serial number of the real estate transaction approval procedure record storage data based on the real estate transaction procedure serial number of the real estate transaction approval procedure data register, and the real estate transaction procedure processing server R(P) deletes data stored in the real estate transaction record register;

wherein the real estate transaction record storage data register of the real estate transaction procedure control server R(C) stores a plurality of real estate transaction record storage data wherein the real estate transaction record storage data is the real estate transaction application procedure record storage data, the real estate transaction investigation procedure record storage data, the real estate transaction appraisal procedure record storage data, the real estate transaction agreement procedure record storage data, the real estate transaction setting procedure record storage data, or the real estate transaction approval procedure record storage data;

wherein the real estate transaction procedure control server R(C) sequentially accesses the real estate transaction file storage data stored in the real estate transaction record storage data register based on operation execution sequence of data operation verification period operation of the system and operation data and stores same in the operation verification data register, and in the data operation verification period, the real estate transaction procedure control server R(C) sequentially performs a storage data operation verification procedure, an added proof information procedure, and an updated proof information procedure on the real estate transaction record storage data stored in the operation verification data register;

wherein the storage data operation verification procedure includes a first storage data operation verification procedure, a second storage data operation verification procedure, and a third storage data operation verification procedure;

wherein the first storage data operation verification procedure including the real estate transaction procedure control server R(C) sends the real estate transaction record storage data of the operation verification data register to the real estate transaction data operation server R(O), the real estate transaction data operation server R(O) performs a data encryption operation on the real estate transaction record storage data based on a system setting data encryption algorithm, and sends a value of the completed encryption operation to the real estate transaction data control server R(C);

wherein the real estate transaction data control server R(C) analyzes same and verifies that at least 50% of the value of the encryption operation is the same, the real estate transaction data control server R(C) correspondingly sets the value of the encryption operation as a record storage data operation code of the real estate transaction record storage data so as to finish an encoding procedure of the storage data of the real estate transaction record storage data;

wherein the real estate transaction data control server R(C) activates the real estate transaction data operation server R(O) to finish the proof information encoding procedure of the real estate transaction record storage data of the operation verification data register so as to set a corresponding proof information record storage data access code of the real estate transaction record storage data;

wherein the second storage data operation verification procedure including the real estate transaction procedure control server R(C) sends the record storage data operation code of the real estate transaction record storage data to the real estate transaction data operation server R(O), the real estate transaction data operation server R(O) performs a data encryption operation on the real estate transaction record storage data based on a system setting data encryption algorithm, and sends a value of the completed encryption operation to the real estate transaction data control server R(C);

wherein the real estate transaction data control server R(C) analyzes same and verifies that at least 50% of the value of the encryption operation is the same, the real estate transaction data control server R(C) correspondingly sets the value of the encryption operation as a record storage data operation code of the real estate transaction record storage data;

wherein the third storage data operation verification procedure including the real estate transaction procedure control server R(C) sends the file storage data code and the file storage data operation code of the real estate transaction file storage data to the real estate transaction data operation server R(O), the real estate transaction data operation server R(O) performs a data encryption operation on the real estate transaction file storage data based on a system setting data encryption algorithm, and sends a value of the completed encryption operation to the real estate transaction data control server R(C);

wherein the real estate transaction data control server R(C) analyzes same and verifies that at least 50% of the value of the encryption operation is the same, the real estate transaction data control server R(C) correspondingly sets the value of the encryption operation as a proof information file storage data access code of the real estate transaction file storage data so as to finish a proof information encoding procedure of the real estate transaction file storage data;

wherein the real estate transaction data control server R(C) activates the real estate transaction data operation server R(O) to finish the proof information encoding procedure of the real estate transaction file storage data of the operation verification data register so as to set a corresponding proof information file storage data access code of the real estate transaction file storage data;

wherein the real estate transaction procedure control server R(C) analyzes same and verifies that at least 50% of the value of the encryption operation is the same, the real estate transaction data control server R(C) correspondingly sets the value of the encryption operation as a proof information file storage data access code of the real estate transaction record storage data so as to finish a proof information encoding procedure of the real estate transaction record storage data;

wherein the real estate transaction data control server R(C) activates the real estate transaction data operation server R(O) to finish the proof information encoding procedure of the real estate transaction record storage data of the operation verification data register so as to set a corresponding proof information file storage data access code of the real estate transaction record storage data;

wherein the added proof information procedure includes a first added proof information procedure, a second added proof information procedure, a third added proof information procedure, a fourth added proof information procedure, and a fifth added proof information procedure;

wherein the first added proof information procedure including the real estate transaction procedure control server R(C) stores the real estate transaction record storage data of the operation verification data register in the proof information record storage data register, sets a corresponding storage address as the proof information record storage data storage address of the real estate transaction record storage data, and sets the proof information record storage data access code of the real estate transaction record storage data and the proof information record storage data storage address as a proof information record storage data access address of the real estate transaction record storage data so as to finish the proof information storage record procedure of the real estate transaction record storage data;

wherein after the real estate transaction procedure control server R(C) has finished the proof information storage record procedure of the real estate transaction record storage data of the operation verification data register, the real estate transaction procedure control server R(C) sets a corresponding proof information record storage data access address of the real estate transaction record storage data; wherein the real estate transaction procedure control server R(C) stores the proof information record storage data access address of the real estate transaction record storage data in the proof information record storage data storage address record table of the real estate transaction record proof information register;

wherein the second added proof information procedure including the real estate transaction procedure control server R(C) sets the record storage data code of the real estate transaction record storage data and the proof information record storage data access code as a proof information record storage data access code of the real estate transaction record storage data to finish the proof information access code encoding procedure of the real estate transaction record storage data;

wherein after the real estate transaction procedure control server R(C) has finished the proof information access code encoding procedure of the real estate transaction record storage data of the operation verification data register, the real estate transaction procedure control server R(C) sets a corresponding proof information record storage data access code of the real estate transaction record storage data;

wherein the third added proof information procedure including the real estate transaction procedure control server R(C) sequentially sets a proof information serial number of the added real estate transaction record proof information based on a serial number of the real estate transaction record proof information stored in the real estate transaction record proof information table of the real estate transaction record proof information register, sets the information verification code of the last real estate transaction record proof information of the real estate transaction record proof information table as a proof information sequence verification code of the added real estate transaction record proof information, and sets the record storage data code as an information verification code of the added real estate transaction record proof information;

wherein the fourth added proof information procedure including the real estate transaction procedure control server R(C) sets the proof information serial number of the added real estate transaction record proof information, the proof information sequence verification code, the information verification code, and the proof information record storage data access code of the real estate transaction record storage data as contents of the added real estate transaction record proof information and stores same in the real estate transaction record proof information table, and the added real estate transaction record proof information is the last real estate transaction record proof information of the real estate transaction record proof information table;

wherein the real estate transaction record proof information of the real estate transaction record proof information table sequentially stores records in the real estate transaction record proof information table based on the set sequence of the real estate transaction record proof information, and creates a real estate transaction record proof information sequence;

wherein the fifth added proof information procedure including the real estate transaction procedure control server R(C) sets the real estate transaction procedure serial number of the real estate transaction record storage data, the proof information serial number of the added real estate transaction record proof information, the proof information sequence verification code, and the record storage data code of the real estate transaction record storage data as a proof information record storage data index code of the real estate transaction record storage data so as to finish the proof information index encoding procedure of the real estate transaction record storage data;

wherein after the real estate transaction procedure control server R(C) has finished the proof information index encoding procedure of the real estate transaction record storage data of the operation verification data register, the real estate transaction procedure control server R(C) sets a corresponding proof information record storage data index code of the real estate transaction record storage data, the real estate transaction procedure control server R(C) sends the proof information record storage data index code of the real estate transaction record storage data to the intelligent real estate transaction procedure management server (C) via the intranet, and stores same in the real estate transaction procedure proof information index table;

wherein the intelligent real estate transaction procedure management server (C) analyzes the real estate transaction procedure serial number of the real estate transaction record storage data of the proof information record storage data index code based on the added real estate transaction record storage data in the real estate transaction procedure proof information index table and verifies that the real estate transaction procedure data register has the same real estate transaction procedure serial number, deletes data stored in the real estate transaction procedure data register, and sends the real estate transaction procedure serial number of the real estate transaction record storage data stored in the proof information record storage data index code of the added real estate transaction record storage data to the intelligent real estate transaction procedure platform server (W);

wherein the intelligent real estate transaction procedure platform server (W) analyzes the real estate transaction procedure serial number of the real estate transaction record storage data of the proof information record storage data index code based on the real estate transaction procedure serial number and verifies that the real estate transaction procedure of the intelligent real estate transaction procedure has the same real estate transaction procedure serial number, and sets the real estate transaction procedure as a finished data proof procedure;

wherein the real estate transaction procedure is the real estate transaction application procedure, the real estate transaction investigation procedure, the real estate transaction appraisal procedure, the real estate transaction agreement procedure, the real estate transaction setting procedure, or the real estate transaction approval procedure;

wherein the update proof information procedure includes a first updated proof information procedure and a second updated proof information procedure;

wherein the first updated proof information procedure including the real estate transaction procedure control server R(C) sends the real estate transaction record storage data of the operation verification data register and the real estate transaction record proof information of the proof information record storage data access code of the real estate transaction record storage data via the intranet and stores same in the updated real estate transaction record proof information register of the real estate transaction procedure processing server R(P) and the updated real estate transaction record proof information register of the real estate transaction procedure operation server R(O), and the real estate transaction procedure control server R(C) deletes data stored in the operation verification data register;

wherein the second updated proof information procedure including the real estate transaction procedure processing server R(P) stores the real estate transaction record storage data of the updated real estate transaction record proof information register in the proof information record storage data register, sets a corresponding storage address as a proof information record storage data storage address of the real estate transaction record storage data, sets the proof information record storage data access code of the real estate transaction record storage data and the proof information record storage data storage address as a proof information record storage data access address of the real estate transaction record storage data, and finishes the proof information storage record procedure of the real estate transaction record storage data;

wherein after the real estate transaction procedure processing server R(P) has finished the proof information storage record procedure of the real estate transaction record storage data of the updated real estate transaction record proof information register, the real estate transaction procedure processing server R(P) sets a corresponding proof information record storage data access address of the real estate transaction record storage data;

wherein the real estate transaction procedure processing server R(P) stores the proof information record storage data access address of the real estate transaction record storage data in the proof information record storage data storage address record table of the real estate transaction record proof information register, the real estate transaction procedure processing server R(P) sets the added real estate transaction record proof information of the updated real estate transaction record proof information register in the real estate transaction record proof information table of the real estate transaction record proof information register, and the added real estate transaction record proof information is the last real estate transaction record proof information of the real estate transaction record proof information table so as to finish the real estate transaction record proof information updating procedure of the real estate transaction procedure processing server R(P);

wherein the real estate transaction record proof information of the real estate transaction record proof information table sequentially stores records in the real estate transaction record proof information table based on the set sequence of the real estate transaction record proof information and creates a real estate transaction record proof information sequence, and the real estate transaction procedure processing server R(P) deletes data stored in the updated real estate transaction record proof information register;

wherein the real estate transaction procedure operation server R(O) stores the real estate transaction record storage data of the updated real estate transaction record proof information register in the proof information record storage data register and sets the corresponding storage address as a proof information record storage data storage address of the real estate transaction record storage data, and sets the proof information record storage data access code of the real estate transaction record storage data and the proof information record storage data storage address as a the proof information record storage data access address of the real estate transaction record storage data so as to finish the proof information storage record procedure of the real estate transaction record storage data;

wherein after the real estate transaction procedure operation server R(O) has finished the proof information storage record procedure of the real estate transaction record storage data of the updated real estate transaction record proof information register, the real estate transaction procedure operation server R(O) sets a corresponding proof information record storage data access address of the real estate transaction record storage data, the real estate transaction procedure operation server R(O) stores the proof information record storage data access address of the real estate transaction record storage data in the proof information record storage data storage address record table of the real estate transaction record proof information register, the real estate transaction procedure operation server R(O) sets the added real estate transaction record proof information of the updated real estate transaction record proof information register in the real estate transaction record proof information table of the real estate transaction record proof information register, and the added real estate transaction record proof information is the last real estate transaction record proof information of the real estate transaction record proof information table so as to finish the real estate transaction record proof information updating procedure of the real estate transaction procedure operation server R(O);

wherein the real estate transaction record proof information of the real estate transaction record proof information table sequentially stores records in the real estate transaction record proof information table based on the set sequence of the real estate transaction record proof information and creates a real estate transaction record proof information sequence, and the real estate transaction procedure operation server R(O) deletes data stored in the updated real estate transaction record proof information register;

wherein after the real estate transaction procedure processing server R(P) and the real estate transaction procedure operation server R(O) have finished the real estate transaction record proof information updating procedure respectively, the proof information updating procedure is finished;

wherein contents of the real estate transaction record proof information table of the real estate transaction record proof information register of the real estate transaction procedure processing server R(P) and contents of the real estate transaction record proof information table of the real estate transaction record proof information register of the real estate transaction procedure operation server R(O) are the same as that of the real estate transaction record proof information table of the real estate transaction record proof information register of the real estate transaction procedure control server R(C) so as to simultaneously and synchronously update the real estate transaction file proof information table;

wherein the user configured to connected to the intelligent real estate transaction procedure platform server (W) via the remote terminal T in order to click the real estate transaction procedure of the intelligent real estate transaction procedure of the finished data proof procedure which is set in the intelligent real estate transaction procedure platform server (W);

wherein the user is the real estate transaction procedure owner or the real estate transaction procedure participant of the real estate transaction procedure; and the real estate transaction procedure is the real estate transaction application procedure, the real estate transaction investigation procedure, the real estate transaction appraisal procedure, the real estate transaction agreement procedure, the real estate transaction setting procedure, or the real estate transaction approval procedure;

wherein the intelligent real estate transaction procedure platform server (W) sends the real estate transaction procedure serial number of the real estate transaction procedure of the intelligent real estate transaction procedure of the finished data proof procedure to the intelligent real estate transaction procedure management server (C);

wherein the intelligent real estate transaction procedure management server (C) analyzes the real estate transaction procedure proof information index table based on the real estate transaction procedure serial number and verifies that the same stored in the real estate transaction procedure proof information index table has the same the proof information record storage data index code of the real estate transaction record storage data of the real estate transaction procedure serial number, and correspondingly stores same in the real estate transaction procedure data register having the same real estate transaction procedure serial number;

wherein the intelligent real estate transaction procedure management server (C) sends the proof information record storage data index code of the real estate transaction record storage data to any of the real estate transaction procedure processing servers R(P) in a low operation storage work load via the intranet;

wherein the real estate transaction procedure processing server R(P) accesses the corresponding real estate transaction record proof information stored in the real estate transaction record proof information table of the real estate transaction record proof information register based on the proof information serial number of the real estate transaction record proof information in the proof information record storage data index code of the real estate transaction record storage data, and analyzes same and verifies that the proof information sequence verification code of the real estate transaction record proof information is the same as the proof information sequence verification code of the real estate transaction record proof information in the proof information record storage data index code of the real estate transaction record storage data so as to confirm that the contents of the real estate transaction record proof information are not tampered with or changed;

wherein the intelligent real estate transaction procedure management server (C) analyzes the real estate transaction procedure proof information index table based on the record storage data code of the real estate transaction record storage data in the proof information record storage data index code of the real estate transaction record storage data, and verifies that the same stored in the real estate transaction procedure proof information index table has the same proof information record storage data access code of the real estate transaction record storage data in the record storage data code of the real estate transaction record storage data;

wherein the real estate transaction procedure processing server R(P) analyzes the real estate transaction procedure proof information index table based on the record storage data code of the real estate transaction record storage data in the proof information record storage data access code of the real estate transaction record storage data, and verifies that the same stored in the proof information record storage data storage address record table of the real estate transaction record proof information register has the same proof information record storage data access code of the real estate transaction record storage data in the proof information record storage data access code of the real estate transaction record storage data;

wherein the real estate transaction procedure processing server R(P) accesses the real estate transaction record storage data stored in the proof information record storage data register based on the proof information record storage data storage address of the real estate transaction record storage data in the proof information record storage data access address of the real estate transaction record storage data, and decrypts the real estate transaction record storage data using a user's personal encryption and decryption data sequence so as to obtain the real estate transaction proof records and the proof information file storage data index code of the real estate transaction file storage data;

wherein the real estate transaction record storage data is the real estate transaction application procedure record storage data, the real estate transaction investigation procedure record storage data, the real estate transaction appraisal procedure record storage data, the real estate transaction agreement procedure record storage data, the real estate transaction setting procedure record storage data, or the real estate transaction approval procedure record storage data;

wherein the real estate transaction procedure processing server R(P) sends the real estate transaction proof records and the proof information file storage data index code of the real estate transaction file storage data to the intelligent real estate transaction procedure management server (C) based on the real estate transaction procedure serial number of the real estate transaction record storage data in the proof information record storage data index code of the real estate transaction record storage data, and stores the corresponding real estate transaction procedure data register store having the same real estate transaction procedure serial number;

wherein the intelligent real estate transaction procedure management server (C) sends the proof information file storage data index code of the real estate transaction record storage data of the real estate transaction procedure data register to any of the real estate transaction data processing server F(P) in a low operation storage work load via the intranet;

wherein the real estate transaction data processing server F(P) accesses the corresponding real estate transaction file proof information stored in the real estate transaction file proof information table of the real estate transaction file proof information register based on the proof information serial number of the real estate transaction file proof information in the proof information record storage data index code of the real estate transaction file storage data, and analyzes same and verifies that the proof information sequence verification code of the real estate transaction file proof information is the same as the proof information sequence verification code of the real estate transaction file proof information in the proof information record storage data index code of the real estate transaction file storage data so as to confirm that the contents of the real estate transaction file proof information are not tampered with or changed;

wherein the real estate transaction data processing server F(P) analyzes the real estate transaction procedure proof information index table based on the record storage data code of the real estate transaction file storage data in the proof information record storage data index code of the real estate transaction file storage data, and verifies that the same stored in the real estate transaction procedure proof information index table has the same proof information record storage data access code of the real estate transaction file storage data in the record storage data code of the real estate transaction file storage data;

wherein the real estate transaction data processing server F(P) analyzes the real estate transaction procedure proof information index table based on the proof information file storage data access code of the real estate transaction file storage data in the proof information record storage data index code of the real estate transaction file storage data, and verifies that the same stored in the proof information file storage data storage address record table of the real estate transaction file proof information register has the same proof information file storage data access code of the real estate transaction file storage data in the proof information file storage data access address of the real estate transaction file storage data;

wherein the real estate transaction data processing server F(P) accesses the real estate transaction file storage data stored in the proof information file storage data register based on the proof information file storage data access address of the real estate transaction file storage data in the proof information file storage data access address of the real estate transaction file storage data, and decrypts the real estate transaction file storage data using a user's personal encryption and decryption data sequence so as to obtain the real estate transaction file division record table;

wherein the real estate transaction file storage data is the real estate transaction application procedure file storage data, the real estate transaction investigation procedure file storage data, the real estate transaction appraisal procedure file storage data, the real estate transaction agreement procedure file storage data, the real estate transaction setting procedure file storage data, or the real estate transaction approval procedure file storage data;

wherein the real estate transaction data processing server F(P) accesses the real estate transaction file division file stored in the real estate transaction file division file register of the real estate transaction data processing server F(P) based on the real estate transaction file division record of the real estate transaction file division record table so that the real estate transaction file division file is configured to convert to the real estate transaction proof file using a conversion procedure, and the real estate transaction data processing server F(P) uses the conversion procedure to obtain the corresponding real estate transaction proof file based on the real estate transaction file division record of the real estate transaction file division record table;

wherein the real estate transaction data processing server F(P) sends the real estate transaction proof files to the intelligent real estate transaction procedure management server (C) based on the real estate transaction procedure serial number of the real estate transaction file storage data stored in the proof information file storage data index code of the real estate transaction file storage data, and stores the corresponding real estate transaction procedure data register having the same real estate transaction procedure serial number;

wherein the intelligent real estate transaction procedure management server (C) sends the real estate transaction proof files of the real estate transaction procedure data register and the real estate transaction proof records to the intelligent real estate transaction procedure platform server (W); and wherein the intelligent real estate transaction procedure platform server (W) sends the real estate transaction proof files of the real estate transaction procedure and the real estate transaction proof records to the remote terminal (T) by performing the intelligent real estate transaction procedure of the finished data proof procedure which has been clicked by the user.

\* \* \* \* \*